April 19, 1932.  R. H. LAWSON  1,854,204
LASTING MACHINE
Filed July 24, 1928  17 Sheets-Sheet 1

April 19, 1932.    R. H. LAWSON    1,854,204
LASTING MACHINE
Filed July 24, 1928    17 Sheets-Sheet 3

INVENTOR-
Robert H. Lawson
By his Attorney,
Harlow H. Davis

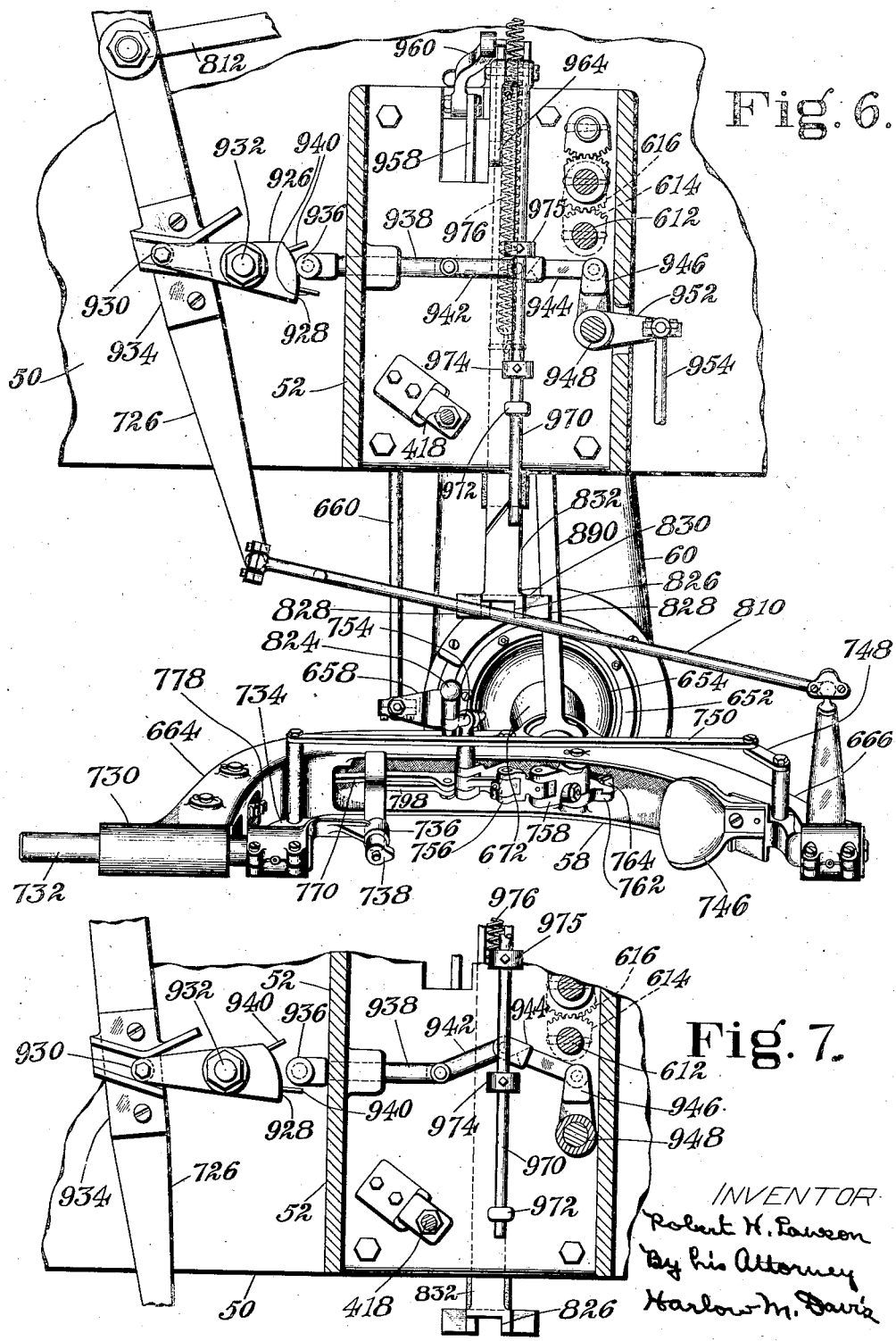

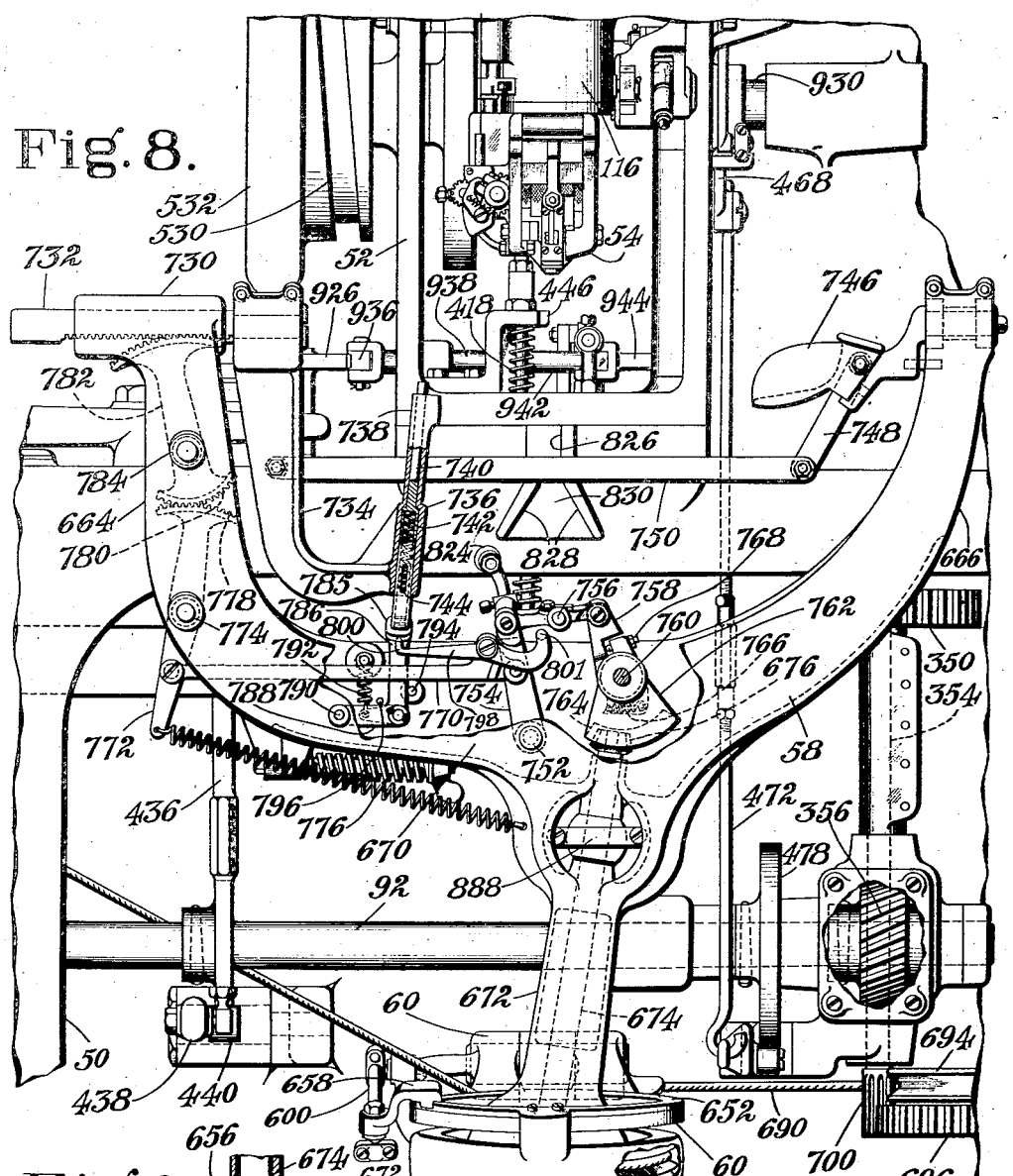
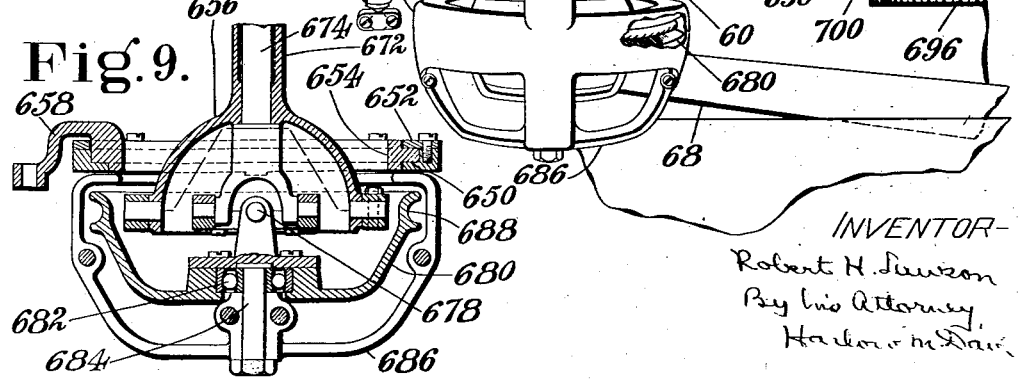

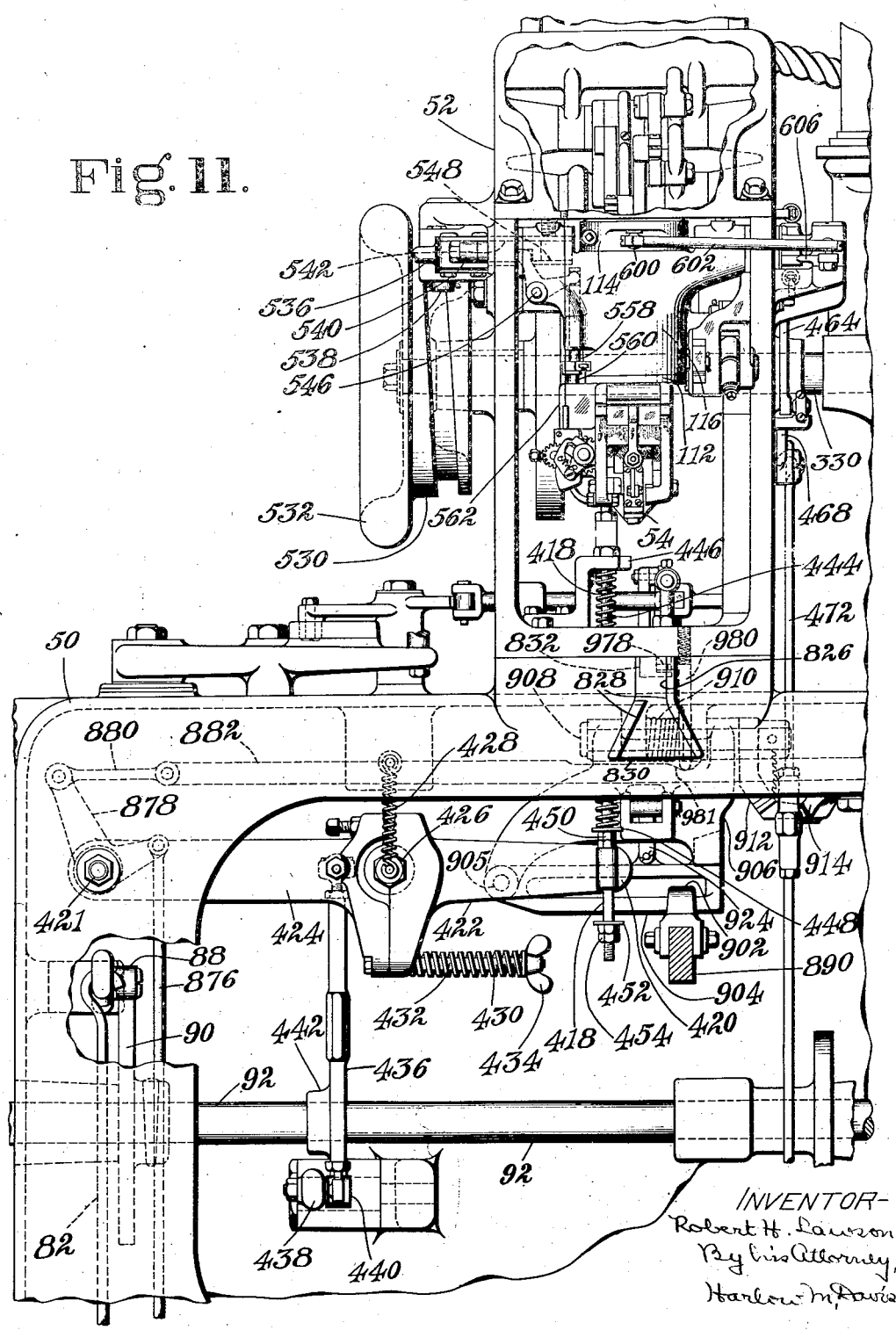

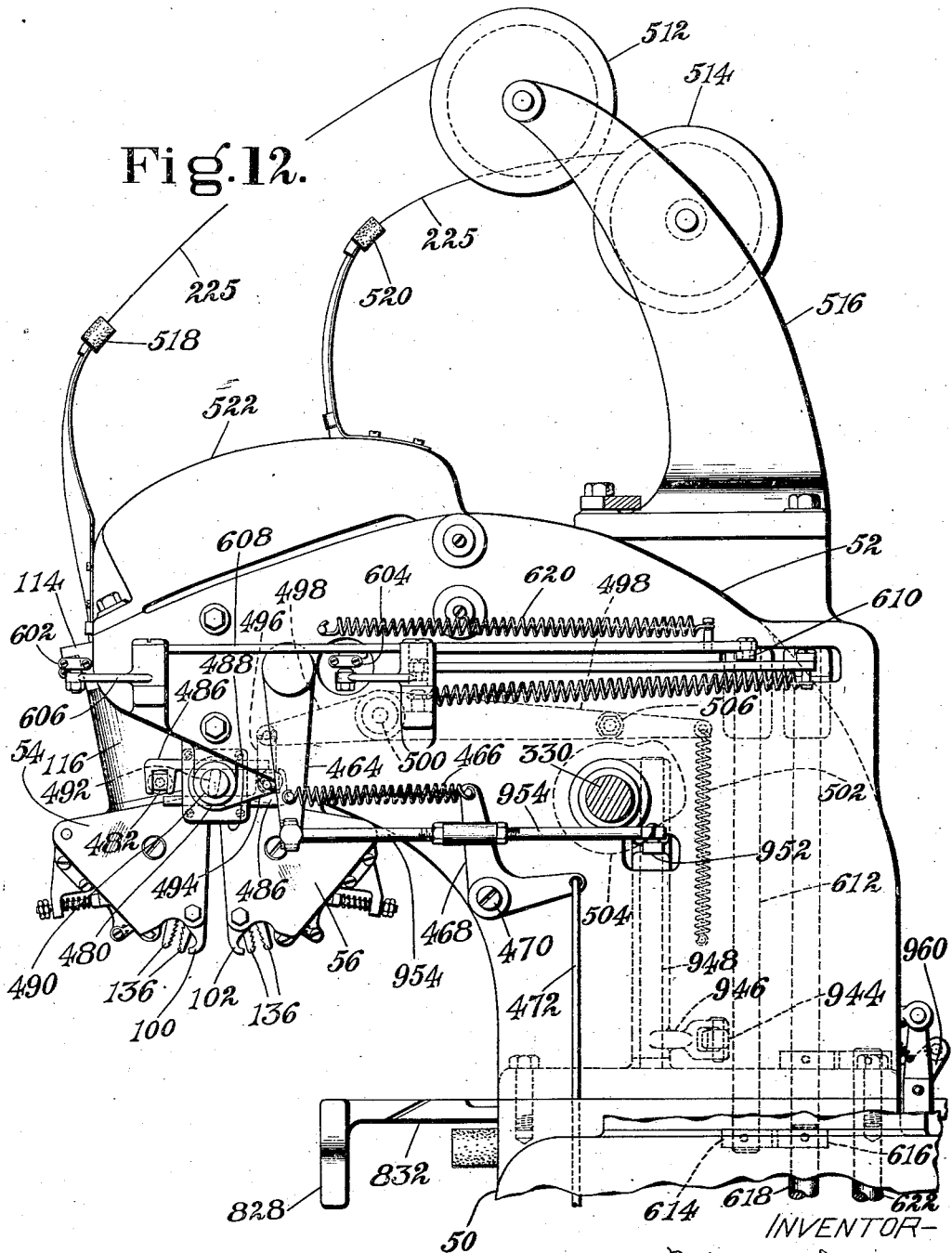

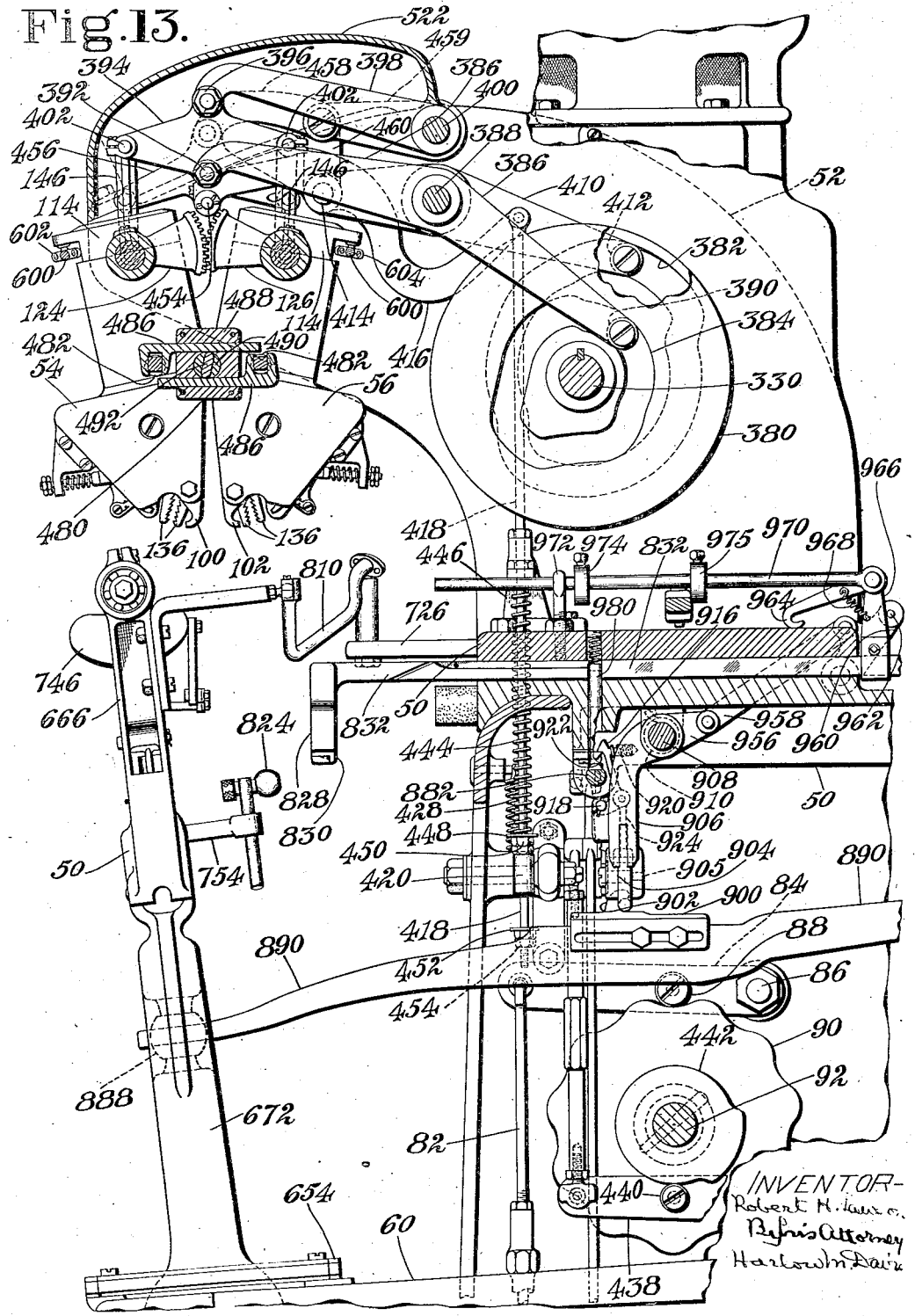

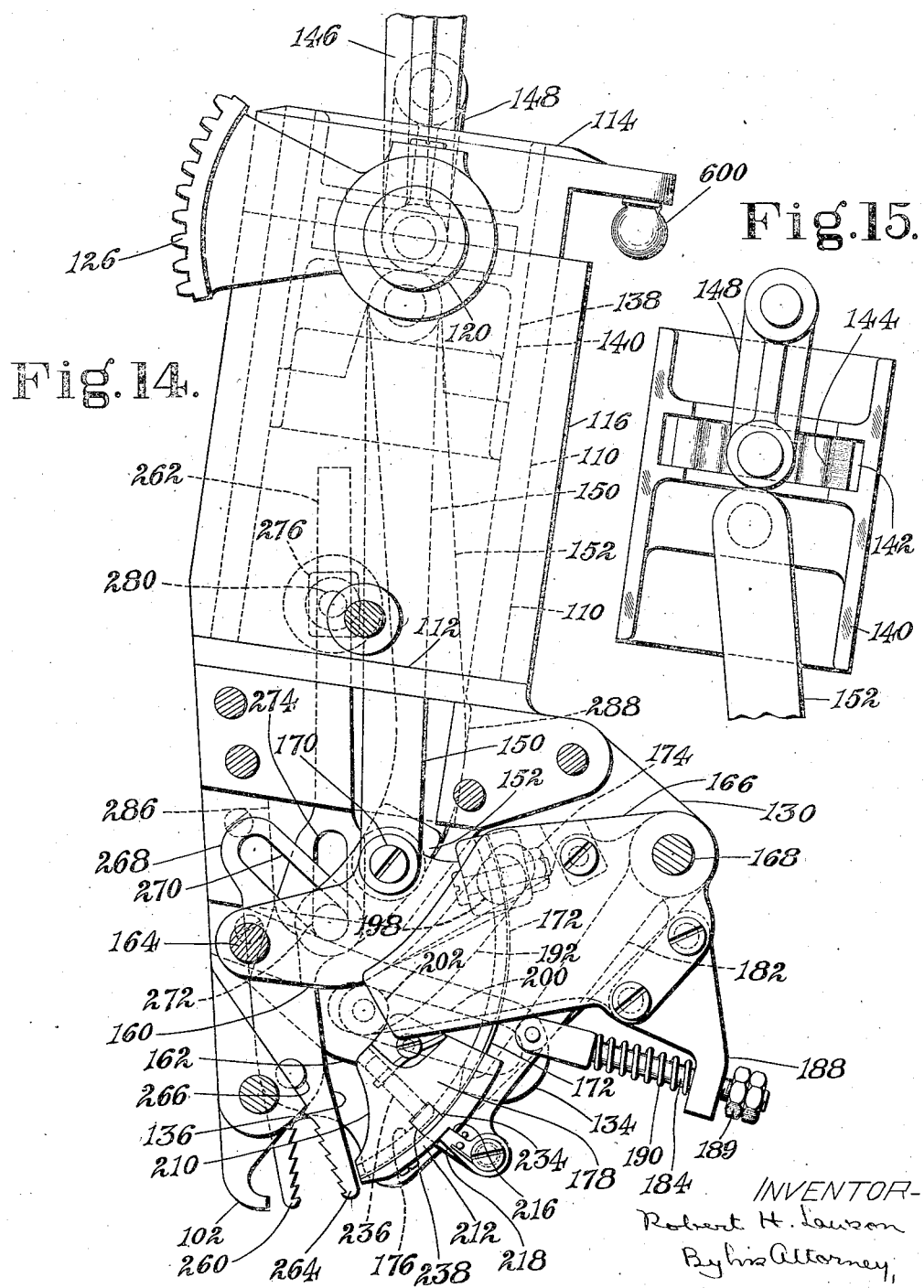

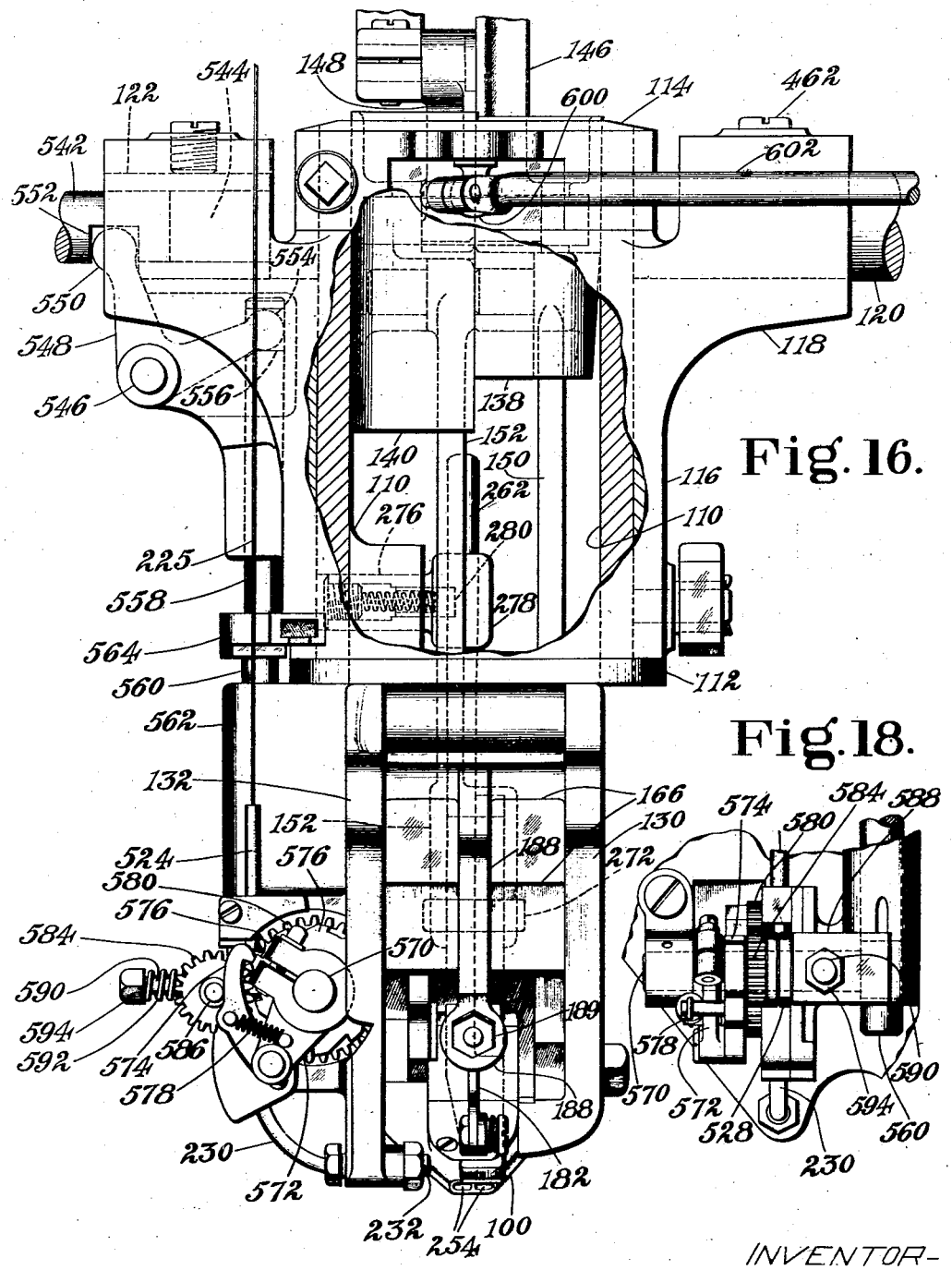

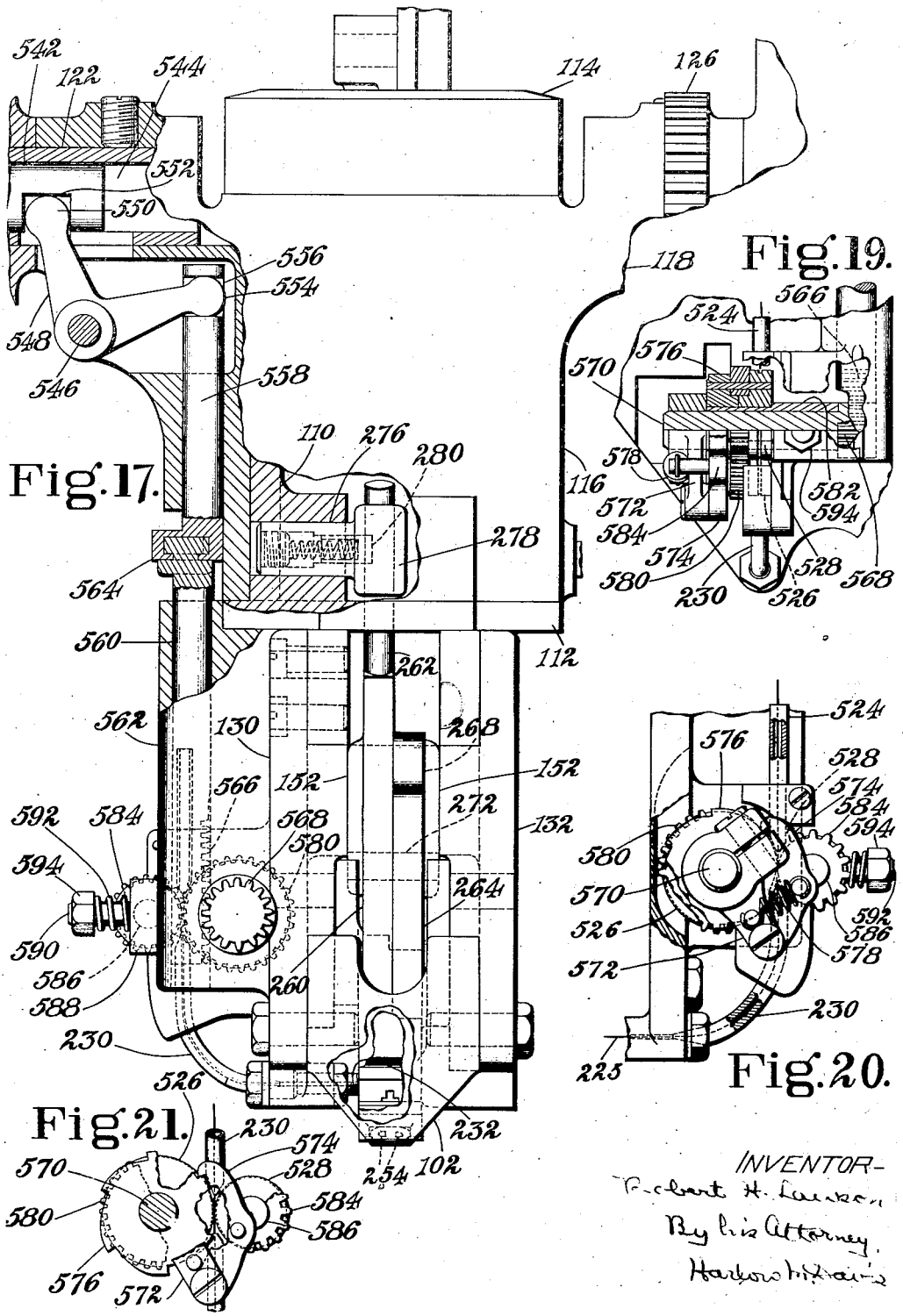

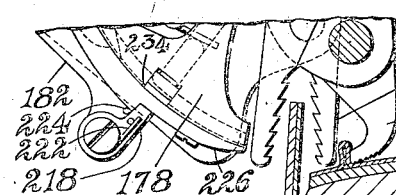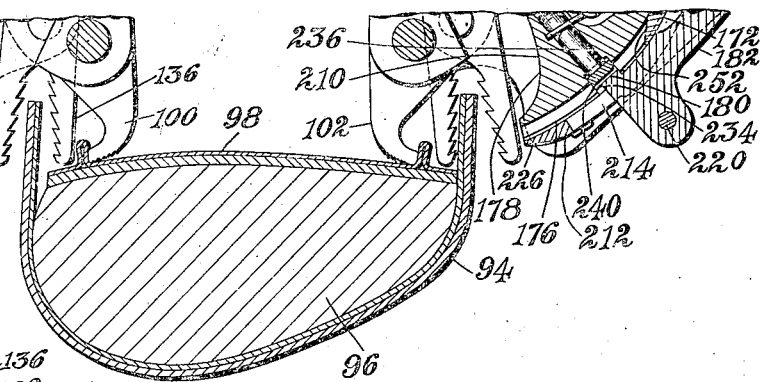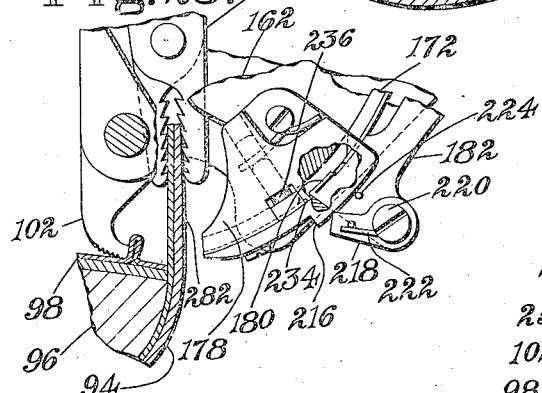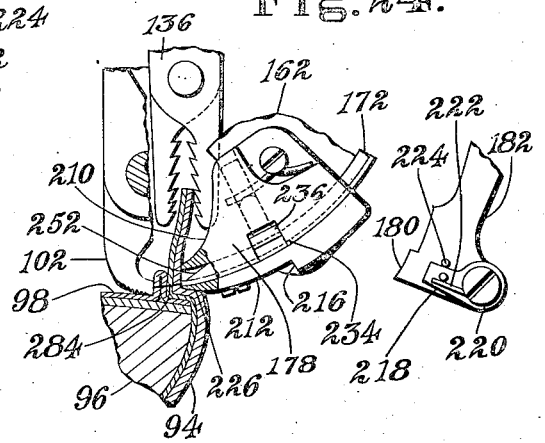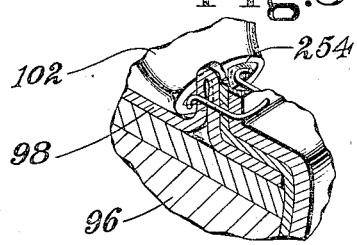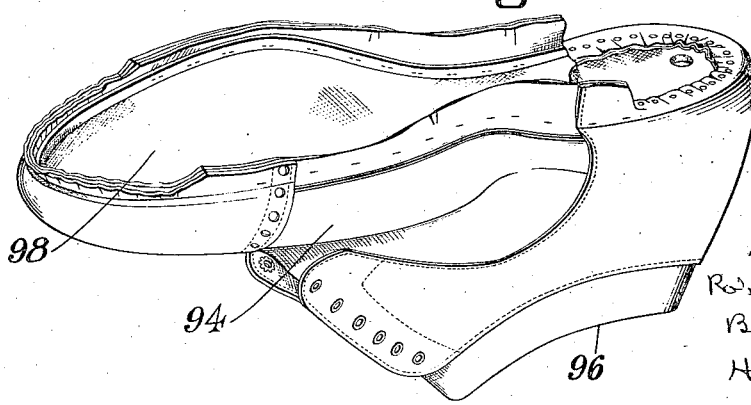

April 19, 1932. R. H. LAWSON 1,854,204
LASTING MACHINE
Filed July 24, 1928 17 Sheets-Sheet 14
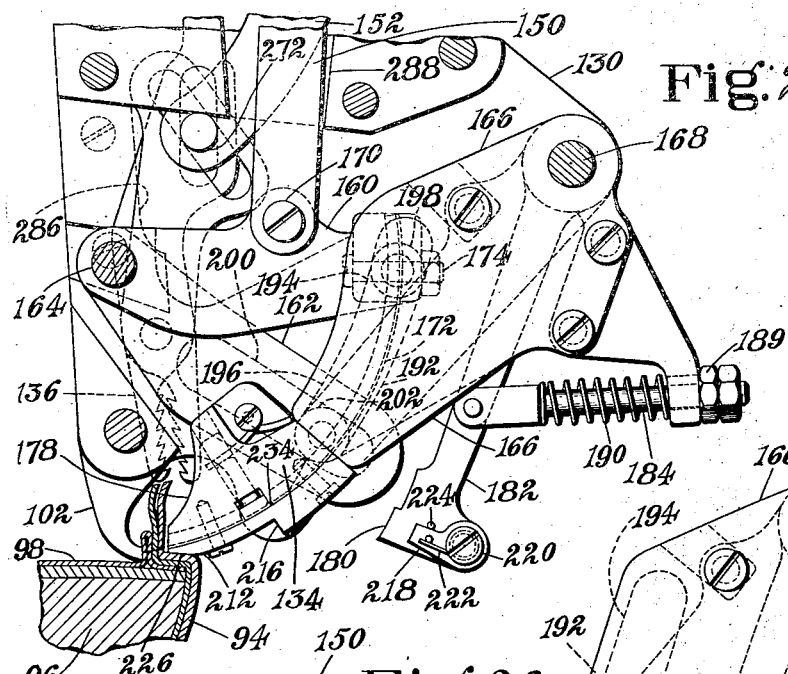
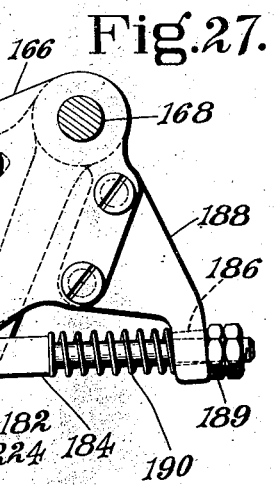
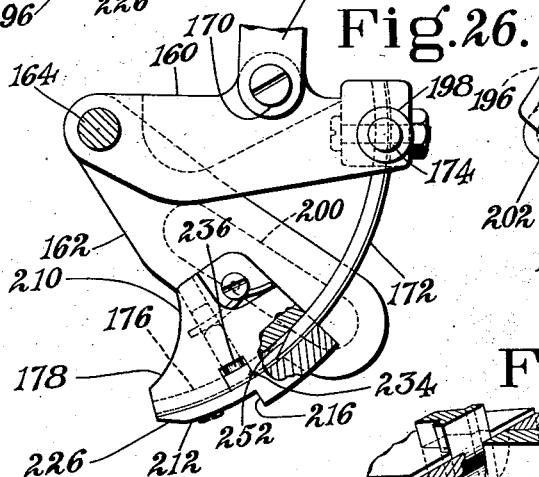
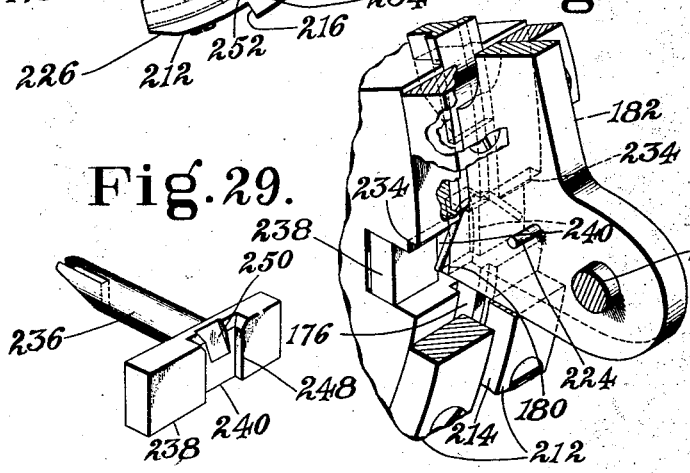
INVENTOR—
Robert H. Lawson
By his Attorney
Harlow M. Davis

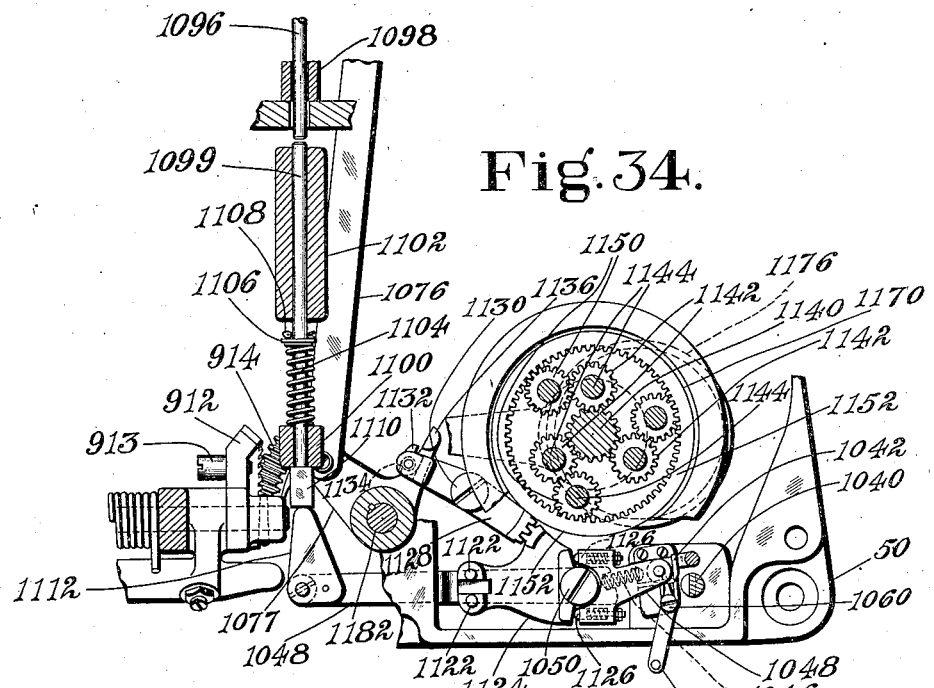
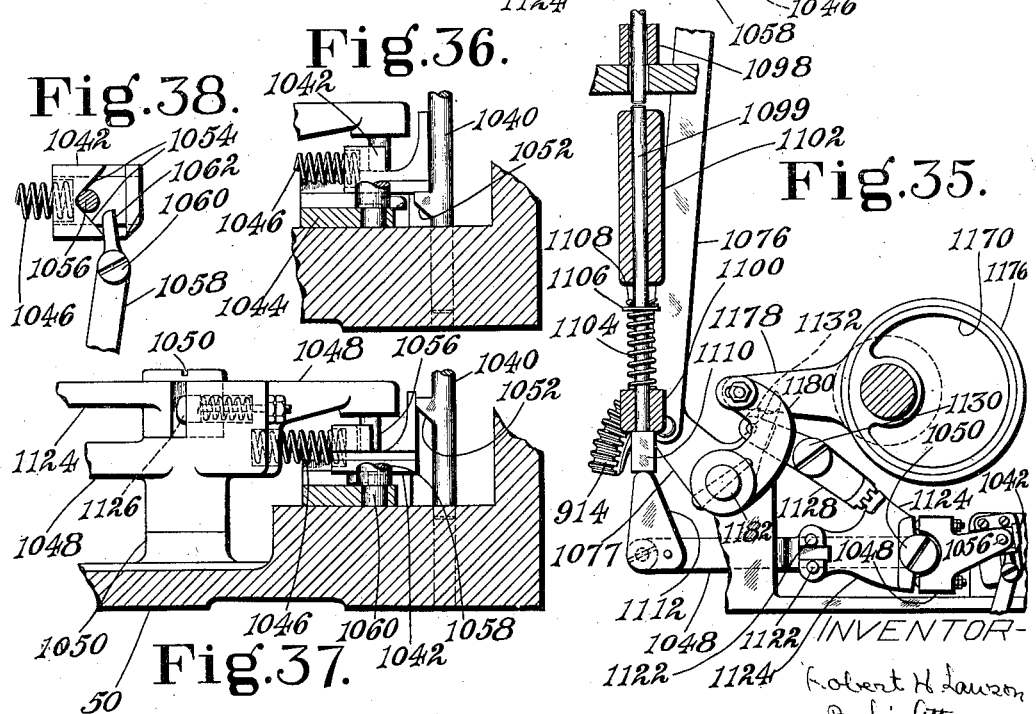

Patented Apr. 19, 1932

1,854,204

UNITED STATES PATENT OFFICE

ROBERT H. LAWSON, OF BEVERLY, MASSACHUSETTS, ASSIGNOR TO UNITED SHOE MACHINERY CORPORATION, OF PATERSON, NEW JERSEY, A CORPORATION OF NEW JERSEY

LASTING MACHINE

Application filed July 24, 1928. Serial No. 295,080.

This invention relates to machines for use in the manufacture of shoes and is illustrated herein as embodied in a lasting machine.

It is an object of the present invention to provide an improved side lasting machine arranged to work a shoe upper into lasted relation to a last and insole and to insert fastenings through the marginal portion of the upper into the insole to secure the upper permanently in lasted relation to the insole. The illustrated machine is arranged to operate from the heel breast line to the tip line, gripping the shoe upper simultaneously at opposite sides of the shoe and tensioning the upper heightwise of the shoe, then wiping the upper inwardly transversely of the insole and inserting staples through the upper into the insole to secure the upper in lasted relation to the insole and the last.

The illustrated machine is of the same general type as, and is in many respects an improvement upon, the lasting machines disclosed and claimed in my copending applications for Letters Patent of the United States, Serial No. 271,393, filed January 16, 1919, renewed February 25, 1922 under Serial No. 539,280, and Serial No. 637,749, filed May 9, 1923. The novel subject-matter common to this and to those earlier machines is not claimed herein since it is claimed in said copending applications. It should be understood, however, that many features of the invention are not limited in their utility to embodiment in lasting machines of this type since they may be utilized to advantage in other types of lasting machines and, indeed, in machines for performing other operations than lasting.

The illustrated machine, like the machines of said copending applications, is provided with a jack arranged to receive a last upon which are assembled a shoe upper and an insole and with a pair of lasting units provided with upper grippers and wipers for tensioning the shoe upper and working it into lasted relation to the last and insole and means for inserting fastenings to secure the upper in that relation. These two units, which, as a matter of convenience, are frequently spoken of herein as "upper tensioning and fastening inserting units", are located, in both the new and the old machine, one upon each side of the shoe to be operated upon and, by relative movement of the units and the jack, operate progressively along the sides of the shoe, lasting the portion of the upper between the heel breast line and the tip line of the shoe. These machines, moreover, are provided with automatic controlling means arranged, when once the machine is started, to cause it to operate through a predetermined number of cycles and then to come to rest. Means is also provided for controlling the relative feeding movement of the upper tensioning and fastening inserting units and the jack in accordance with the size of the shoe in the jack so that the length of the steps of the feeding movement, which takes place between the successive operations of the upper tensioning and fastening inserting units, is varied in accordance with the size of the shoe, whereby the necessity of varying the number of these steps in operating upon shoes of different sizes is avoided.

In accordance with an important feature of the invention the illustrated lasting machine is provided with upper tensioning means operating simultaneously on opposite sides of the shoe in combination with means for forming staples from fine wire and for inserting two staples simultaneously, one on each side of a shoe, through the upper into the insole to secure the upper in lasted relation to the insole and to the last upon which it is mounted. Since the illustrated machine is intended to be used for lasting Goodyear welt shoes, it is arranged to insert the staples through the shoe upper into the rib of a ribbed insole mounted on the last and to clench the staples on anvils which back up the rib of the insole. The shoe is fed step-by-step rearwardly between successive operations of the upper tensioning and staple inserting units so that the lasting operation is performed progressively from the heel breast line forwardly to the tip line.

In accordance with a feature of the invention, in order properly to tension the shoe upper as the upper tensioning and staple inserting units operate progressively along the marginal portions of the shoe upper, improved means is provided to vary the heightwise pull of the gripper mechanisms upon different parts of the shoe upper. In the illustrated machine the force of the pull is controlled by a cam and connections therefrom to the gripping mechanisms arranged to cause the gripping mechanisms to apply comparatively little tension when operating along the shank portion of the shoe and to apply a greater tension when operating about the ball portion or forepart.

To cause the illustrated machine to eliminate any wrinkles that may be present between the rear end of the shoe and the grippers which tension the shoe upper heightwise of the last, the machine is provided, in accordance with a further feature of the invention, with means for causing relative movement of the grippers and the last in a direction lengthwise of the last while the grippers maintain their tension on the shoe upper heightwise of the last.

In accordance with a further feature of the invention, the illustrated machine is provided with means for turning the upper tensioning and staples inserting units about axes approximately at right angles to the surface of the insole thereby to maintain the angular relation of the upper tensioning and stapling units to the edge of the insole uniform and to insure that the staples will be driven substantially at right angles to the surface of the rib of the insole. To equalize the pressure of the insole of the shoe operated on against the presser feet of the machine, and to maintain the angular relation of the upper tensioning and stapling units to the portion of the surface of the insole adjacent to which they are operating substantially constant, means is also provided for rocking the work supporting jack about an axis extending transversely of the shoe. This maintains the portion of the last bottom at which the operation is being performed at all times substantially in the same plane.

In accordance with a further feature of the invention, the illustrated machine is provided with novel means for controlling the position of the upper tensioning and fastening inserting mechanism widthwise of the shoe at the start of the operation, said means being controlled by the length of the shoe in the jack through connections which are operative as the jack is moved into operative relation to the operating instrumentalities of the machine but which are rendered inoperative before the operation upon the shoe is actually started.

The staple forming and inserting mechanism herein disclosed, the lever mechanism forming a portion thereof, and the jack structure of the illustrated machine are not claimed herein since they form the subject-matter of copending divisional applications, Serial No. 483,909, filed September 23, 1930; Serial No. 471,514, filed July 29, 1930; and Serial No. 497,237, filed November 21, 1930, respectively.

With the above and other objects and features in view the invention will now be described with reference to the accompanying drawings, which illustrate a preferred embodiment of the invention, and pointed out in the claims.

In the drawings,

Fig. 6 is a plan view of the jack and of parts of the measuring mechanism for controlling the extent of each step of the work feeding movement of the jack in accordance with the length of the shoe in the jack, the parts being shown in the relative positions which they occupy when the machine is at rest;

Fig. 7 is a plan view of a portion of the controlling mechanism of Fig. 6, showing the parts in the positions which they occupy when the machine is in operation;

Fig. 8 is a front elevation on a larger scale than Fig. 1, showing particularly the jack in the position which it occupies when the machine is at rest and the jack is empty;

Fig. 9 is a cross sectional view of the base of the jack;

Fig. 11 is a front elevation of the head and the upper right-hand portion of the base of the machine with the jack removed and illustrating particularly portions of the jack controlling mechanism and means for giving stock tensioning movement to the grippers of the lasting mechanism;

Fig. 12 is a side elevation of the head of the machine taken from the right;

Fig. 13 is a sectional view through the head of the machine and the portion of the machine immediately below the head, showing the jack also in end elevation;

Fig. 14 is a side elevation, with a cover plate removed, of the rear upper tensioning and staple forming and inserting unit carried by the head of the machine;

Fig. 15 is a detail view of a portion of the driving connections to one of the upper tensioning and staple forming and inserting units;

Fig. 16 is a front view of the rear upper tensioning and staple forming and inserting unit;

Fig. 17 is a front view of the forward upper tensioning and staple forming and inserting unit;

Figs. 18, 19, 20 and 21 are detail views of the means for feeding wire to the forward staple forming and inserting unit;

Fig. 22 is a cross sectional view through the forepart of a shoe in the process of being lasted by the machine and showing the relation of the upper tensioning and staple inserting mechanisms to the shoe parts;

Fig. 23 is a view of the grippers of the rear upper tensioning and staple forming and inserting unit in the position which they occupy at the conclusion of their updraw movement and showing also portions of the stapling mechanism in the position which they occupy at the conclusion of the staple forming operation and before the throat member has been moved into engagement with the shoe;

Fig. 24 shows the same parts as Fig. 23 in the positions which they occupy at the conclusion of the driving of a staple;

Fig. 25 shows the same parts as Figs. 23 and 24, together with portions of the operating mechanism therefor, in the positions which they occupy during the feeding movement of the work;

Figs. 26 and 27 are detail views of portions of the staple forming and driving mechanism;

Fig. 28 is a large scale view showing the formation of a staple by relative movement of the inside and outside formers;

Fig. 29 is a perspective view, on the same scale as Fig. 26, of a plunger shown also in Fig. 26;

Fig. 30 is a large scale view illustrating the clenching of a staple;

Fig. 31 is a perspective view illustrating a Goodyear welt shoe which has been side lasted by the machine;

Fig. 34 is a horizontal section of the controlling mechanism on the line XXXIV—XXXIV of Fig. 33;

Fig. 35 is a horizontal section of the controlling mechanism on the line XXXV—XXXV of Fig. 32; and Figs. 36 and 37 are front elevations, partly in section, and Fig. 38 is a plan view, partly in section, illustrating particularly a latch mechanism by means of which the machine may be brought to rest by the operator at any time and without completing its normal series of cycles of operation.

*General organization of the machine*

Figure 1:
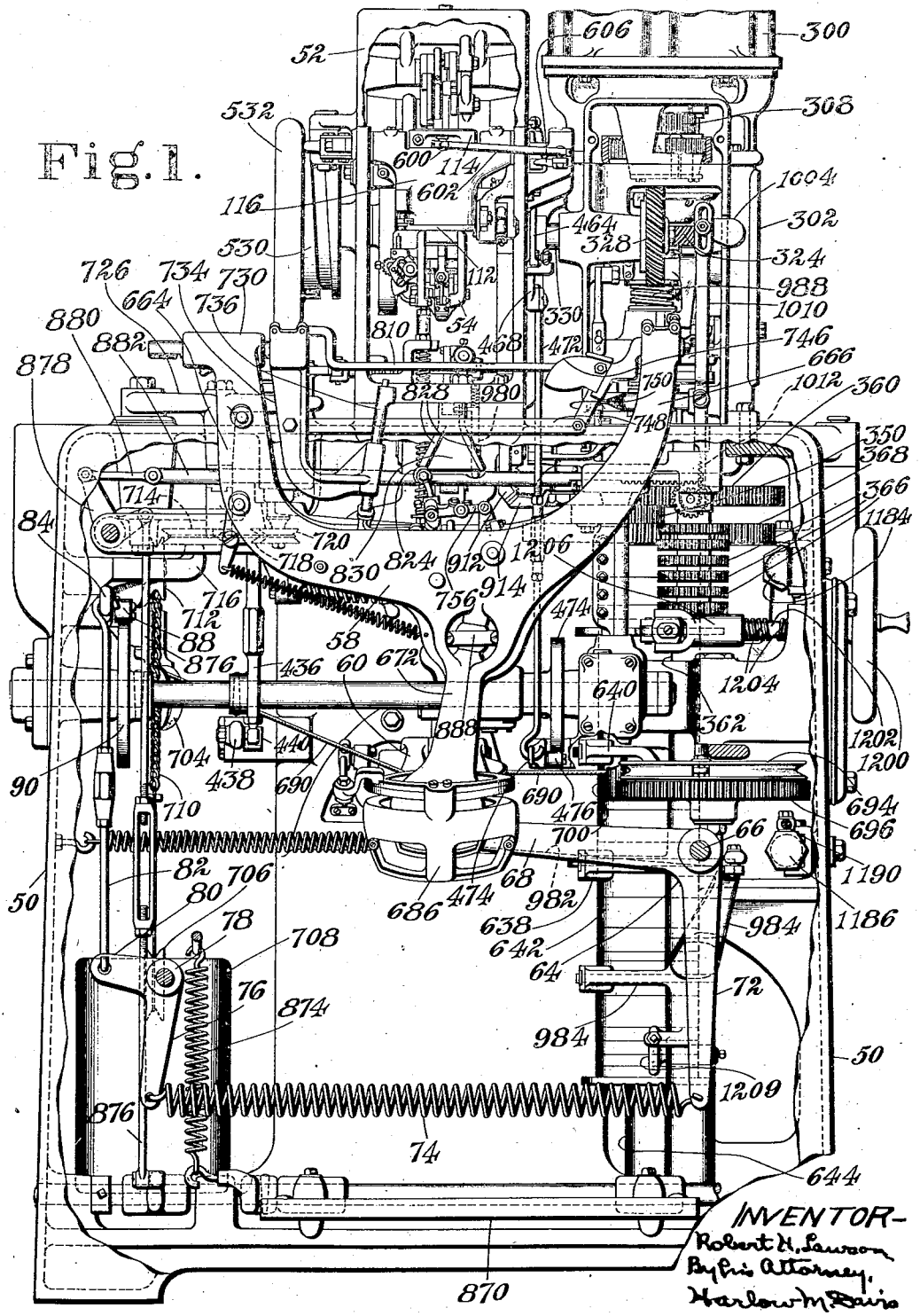
Fig. 1 is a front elevation of a side lasting machine embodying the invention, various portions of the box-like frame or base of the machine being broken away more clearly to disclose the moving parts of the machine.
Figure 2:
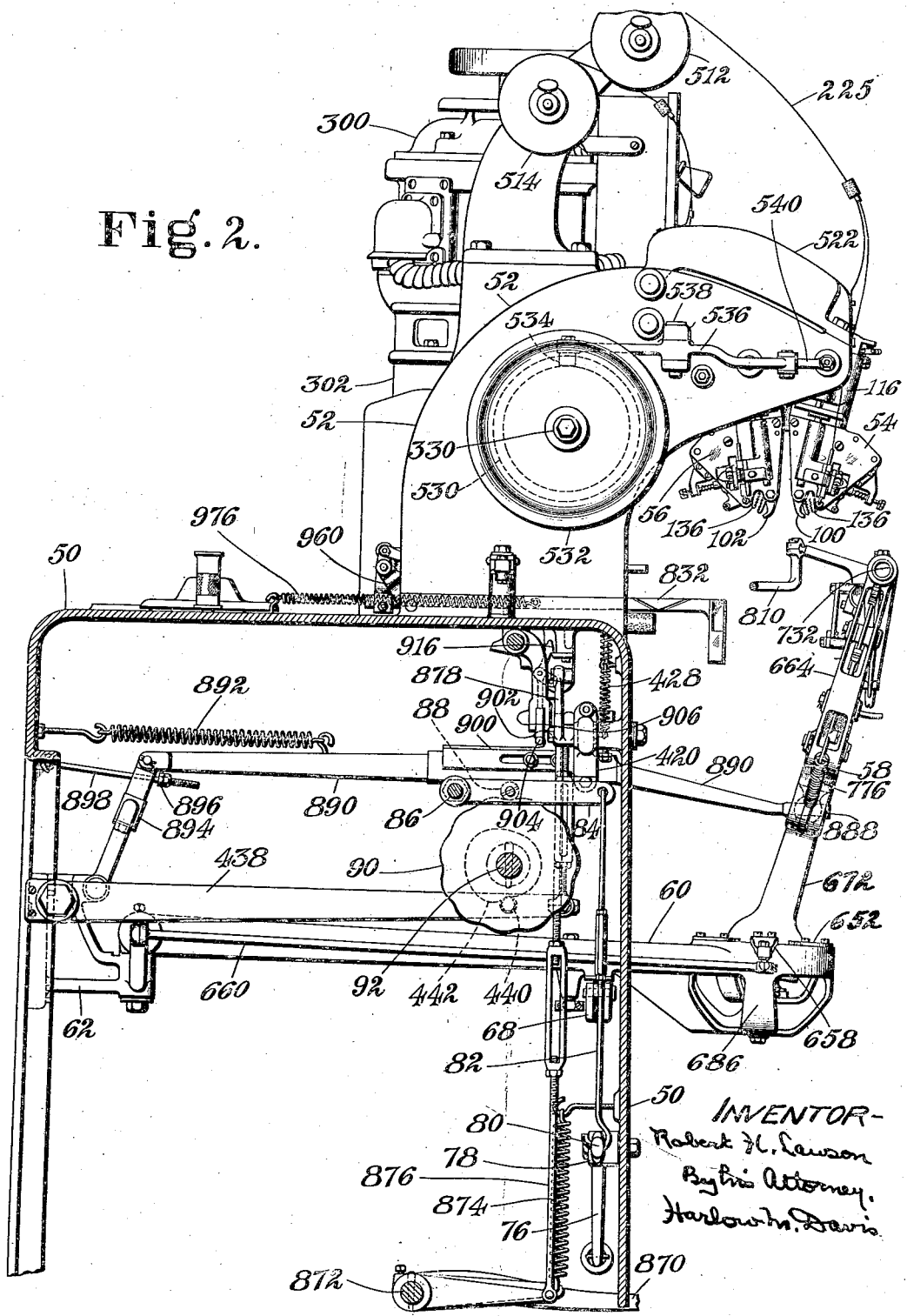
Fig. 2 is a side elevation of the machine of Fig. 1 looking from the left, the box-like base being shown in cross section.
Figure 3:
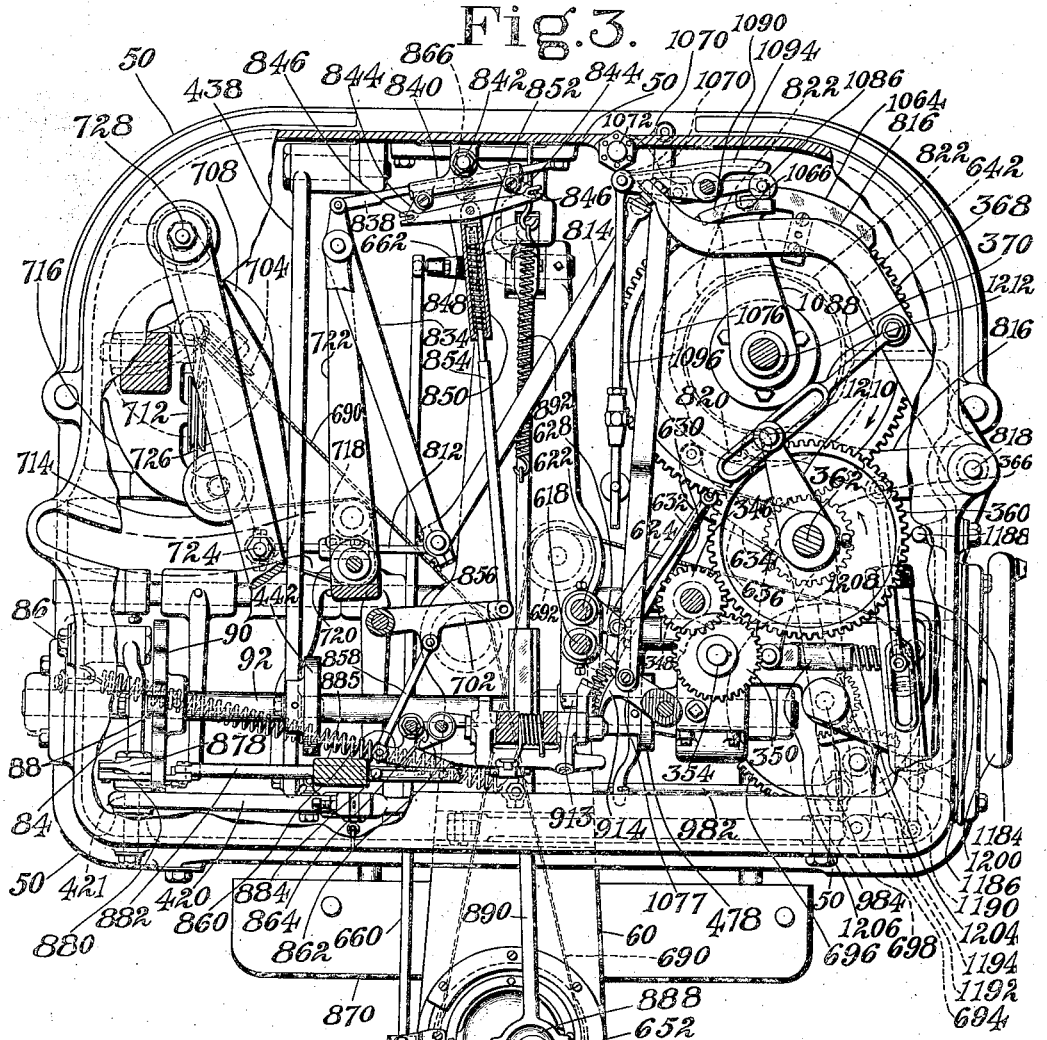
Fig. 3 is a horizontal section taken below the head of the machine and with the top portion of the base largely broken away to show the mechanism therebelow.

The illustrated side lasting machine is provided with a box-like base or frame 50, best shown in Figs. 1, 2 and 3, carrying a head 52 which supports, at the front of the machine, a pair of lasting units 54, 56, each provided with means for working a shoe upper into lasted relation to a last and insole, and with means for forming staples and inserting them through the shoe upper into the insole to secure the shoe upper in lasted relation to the last and insole. These mechanisms are for convenience spoken of in this specification as upper-tensioning and stapling units. Beneath these upper-tensioning and staping units is a jack 58 carried at the forward extremity of an arm 60. The rear end of the arm 60 is supported by a bracket 62 (Fig. 2) secured to the base 50, the connections between the arm 60 and the bracket 62 being such as to permit both horizontal and vertical swinging movement of the arm 60. The arm 60 is supported near its forward extremity by a bell crank lever 64 fulcrumed at 66 to the frame 50 and having a substantially horizontally extending arm 68 carrying a roll 70 bearing against the lower surface of the arm 60 (see Figs. 1 and 10). The bell crank lever 64 also has a substantially vertically extending arm 72 to the lower end of which is secured one end of a long coil spring 74 the other end of which is secured to a downwardly extending arm 76 of another bell crank lever 78 also fulcrumed to the base 50 and having a substantially horizontally extending arm 80 connected by a link 82 to a lever 84 (Figs. 1 and 2) fulcrumed at 86 to the base 50. The lever 84 carries a cam roll 88 bearing against a cam 90 fast upon a transversely extending cam shaft 92 which is rotated by mechanism hereinafter described once during the operation of the machine upon each shoe.

The machine is provided with means for moving the jack 58 toward the left as viewed in Fig. 1 to present different parts of the shoe to be operated on successively to the upper-tensioning and stapling units 54, 56. The configuration of the cam 90 is such as to rock the bell crank lever 64 in a clockwise direction as viewed in Fig. 1 to hold a shoe 94 mounted upon a last 96 (Fig. 10) carried by the jack 58 in its uppermost position with its insole 98 pressed against a pair of presser feet 100, 102 (Figs. 2, 12, 13 and 22) carried by the upper-tensioning and stapling units 54, 56 at the time of the insertion of staples and to rock the lever 68 a few degrees in a counterclockwise direction to relieve the pressure of the insole 98 against the presser feet 100, 102 of the upper-tensioning and stapling units 54, 56 while the work is being fed.

*The upper-tensioning and stapling units*

Each of the upper-tensioning and stapling units 54, 56 is carried by a support having a cylindrical portion 110 (Figs. 14, 16 and 17) provided at its lower end with a flange 112 and at its upper end with a collar 114 clamped to the cylindrical portion 110. Each cylindrical portion 110 is positioned in a sleeve 116 of a bearing block 118 supported for forwardly and rearwardly swinging movement by a pair of trunnions 120, 122 carried by the head of the machine. The flange 112 and the collar 114 serve to prevent vertical movement of the upper-tensioning and stapling units 54, 56 but permit the units to rotate about the approximately vertical axis of the cylindrical portion 110 and the sleeve 116. The bearing blocks 118 are provided with a pair of gear segments 124, 126 meshing with each other so that the two upper-tensioning and stapling units 54, 56 will have equal but opposite movement as they are swung toward and from each other.

Each cylindrical portion 110 carries at its lower end a pair of parallel plates 130, 132 (Figs. 14, 16 and 17) between which the staple forming and inserting mechanism 134 (Figs. 14 and 25) and a pair of pincers or grippers 136 are carried.

Housed within each of the cylindrical portions 110 is a pair of similar slide members or cross-heads 138, 140 (Figs. 14, 15 and 16), each having a semi-cylindrical outline. These slide members 138, 140 are moved lengthwise of the cylindrical portions 110 by mechanism hereinafter described and are effective to operate the staple forming and inserting mechanism 134 and the upper gripping pincers 136, respectively, regardless of and without interference by swinging movement of the upper-tensioning and stapling units 54, 56 about their trunnions 120, 122 or turning movement of the units about the axis of their cylindrical portions 110. To permit this turning movement, each of the slide members 138, 140 is provided with a groove 142 parallel to the circumference of the slide member and receiving a block 144 having a cylindrical outer surface so as to permit rotation of the slides 138, 140 about their axes while the blocks 144 remain stationary. The blocks 144 are connected by links 146, 148 to the means for operating the staple inserting mechanism 134 and the upper gripping pincers 136, respectively. The slides 138 and 140 are connected to the staple inserting mechanism 134 and to the upper gripping pincers, respectively, by links 150, 152 (Fig. 14).

*The staple forming and inserting means*

The staple forming and inserting means of each unit 54, 56 is carried by two levers 160, 162 fulcrumed at 164 to the plates 130, 132 and a third lever 166 fulcrumed at 168 to the plates 130, 132. See particularly Figs. 14, 25, 26 and 27. The link 150 is pivoted to the lever 160 at 170. An arcuate driver 172, T-shaped in cross-section, is clamped at 174 to the lever 160 and passes through a similarly shaped driver passage 176 formed in a throat member 178 carried by the lever 162. An inside former 180 is provided at the lower end of a lever 182 fulcrumed to the plates 130, 132 at 168. A rod 184 is pivoted at one end to the lever 182 and passes at the other end through a hole 186 formed in an arm 188 of the lever 166. A nut and lock nut 189 threaded on the end of the rod 184 limit the movement of the lever 182 in a clockwise direction, as viewed in Figs. 14 and 27, under the influence of a compression spring 190 surrounding the rod 184 and bearing at one end against a shoulder formed upon that rod and at the other end against the arm 188 of the lever 166.

As illustrated, the lever 162 is in the form of two parallel plates straddling the lever 160 and the lever 166 similarly straddles the lever 182. The plates of the lever 166 are provided with a pair of parallel slots 192 the upper portions 194 of which are straight and the lower portions 196 of which are formed as arcs of circles which, when the parts are in staple inserting position, are concentric with the fulcrum 164 of the levers 160 and 162. The slots 192 receive a pair of rolls 198 carried at the outer end of the lever 160. Thus, as the lever 160 is rocked in a clockwise direction as viewed in Fig. 25, the lever 166 will be rocked in a counterclockwise direction until the rolls 198 reach the arcuate portion 196 of the slot 192. When this position is reached, further movement of the lever 160 will not affect the position of the lever 166 which, on the contrary, will be locked against rocking movement by the presence of the rolls 198 in the arcuate portions of the slots 192.

The plates of each lever 162 are provided with a pair of straight slots 200 receiving a pair of rolls 202 carried by the lever 166. As the lever 166 is rocked during the earlier part of the movement of the lever 160, while the rolls 198 move along the straight portions 194 of the slots 192, the lever 162 is also rocked in a clockwise direction through the engagement of the rolls 202 carried by the lever 166 in the slots 200 of the lever 162. When, however, the rolls 198 reach the arcuate portions 196 of the slots 192 of the lever 166 and the lever 166 thus becomes stationary, the lever 162 is also locked against further movement. At this time lines drawn from the center of the fulcrum 164 to the center of the roll 202 and from the center of the roll 202 to the center of the fulcrum 168 are at right angles to each other. At this time also the outer end of the throat member 178 is pressed firmly against the work piece as shown in Fig. 24, and it is so held during the driving of each staple.

Each throat member 178 is formed of two principal parts, as best shown at the right-hand side of Fig. 22. These consist of a block 210 having an arcuate outer surface concentric with the fulcrum 164 in which surface is formed a driver passage or throat opening of T-shape cross-section corresponding to that of the driver 172, and a cover plate 212 formed with a slot 214 (Figs. 22 and 28) to permit the entrance of the inside former 180. Adjacent to the slot 214, the cover plate 212 is provided with a shoulder 216 (Figs. 25 and 26) co-operating with a pawl 218 pivoted at 220 to the lever 182 and urged in a clockwise direction, as viewed in Figs. 14, 24 and 25, by a spring 222 into engagement with a pin 224 carried by the lever 182. The lower portion 226 of the forward end of the cover plate 212 serves as a wiper to wipe the shoe upper 94 over the feather and into engagement with the rib of the insole 98 (Fig. 24).

The two wires 225 from which the staples are formed are fed to the units 54, 56 by mechanism hereinafter described through tubes 230, each having an adjustable end portion 232 leading to a passage 234 formed in the block 210 of the throat member 178 and enclosed by the cover plate 212, each passage 234 being positioned in alinement with the outlet end 232 of the corresponding tube 230 at the time the wire 225 is fed and being moved from that position to shear a length of wire from which a staple is to be formed during the return movement of the throat member 178. The feeding of the wires takes place soon after the staples have been driven and while the parts are approximately in the position shown in Fig. 25.

Each throat block 210 carries a spring-pressed plunger 236 (Figs. 14, 22, 25 and 29) having a head 238 in which is formed a slot 240 which, when the plunger is in the position shown in Figs. 24, 25 and 26, constitutes a part of the driver passage. The upper portion of the head 238 forms also part of one of the walls of the wire passage 234. The upper end of the slot 240 is somewhat enlarged, as best shown in Fig. 29, in order freely to receive the leading end of the driver 172 and is provided with a narrower slot 250 to receive the upstanding flange of the driver which flange is beveled at its entering end, as clearly shown at 252 in Fig. 26. Thus, the walls of the wire passage 234 are substantially complete at the time the wire is fed.

The plunger 236 is positioned in the path of movement of the inside former 180 and when the inside former 180 moves into operative position is displaced, leaving the inside former just ahead of the wire from which the staple is to be formed, as shown in Figs. 22 and 28. Downward and forward movement of the throat member 178 relatively to the inside former 180 at this time causes the walls of the driver passage 176 to serve as outside formers, as shown in Fig. 28, forming a staple from a piece of wire.

When the lever 160 is rocked in a clockwise direction from the position shown in Fig. 14, which shows the parts of the upper-tensioning and stapling mechanisms in the position they assume when the machine is at rest, the rocking movement of the levers 160 and 162 is relatively great, the lever 162 moving almost as fast as the lever 160 so that the driver 172 does not reach the position of the wire passage until after a staple has been formed and the inside former 180 withdrawn. After the staple has been formed, as shown in Fig. 23, however, and after the inside former has been withdrawn, the lever 162 slows down and finally comes to rest in engagement with the work, before the lever 160 has finished its movement. Continued movement of the lever 160 while the levers 162 and 166 are stationary causes the driver 172 to move forward and drive a staple through the shoe upper 94 and the rib of the insole 98, the staple being clenched against a clenching cavity 254 formed in a substantially vertical surface with which each of the presser feet 100, 102 is provided. The presser feet 100, 102 thus, in addition to serving as abutments to position the shoe vertically and as gages bearing against the inner surface of the rib of the insole 98 to position the shoe transversely, also serve as clenching anvils.

*The formation of a staple*

When the inside former 180 first moves toward the throat member 178, its pawl engages the throat member above the shoulder 216, the pawl 218 serving to hold the inside former 180 out of the driver passage 176. This is during the return movement of the levers 160, 162 and 166. Continued movement of the lever 162 and the throat member 178 in a counterclockwise direction, as viewed in Fig. 25, permits the pawl 218 to drop off the shoulder 216 so that the inside former 180 can enter the driver passage 176, displacing the plunger 236 and leaving the parts in the position shown at the right hand side of Fig. 22 ready for the formation of a staple which takes place soon after the starting of the downward movement of the throat member 178 in the next cycle of operation of the staple forming and inserting means. As this takes place, the pawl 218 swings in a counterclockwise direction to the position shown in Fig. 23. Soon after this the counterclockwise movement of the lever 166 causes the arm 188 of that lever to engage against the nut 189 withdrawing the inside former 180 from the driver passage 176 and leaving a complete staple in the driver passage ready to be inserted. The withdrawal of the inside former 180 also permits the plunger 236 to move forward thereby completing the driver passage.

The lasting pincers or grippers

Each of the upper-tensioning and stapling units 54, 56 is, as already stated, provided with a pair of pincers or grippers 136. These mechanisms each comprise a gripper jaw 260 (Figs. 14 and 17) having a long upwardly extending shank 262 and a gripper jaw 264 fulcrumed at 266 to the jaw 260 and having a shorter upwardly extending portion 268 provided with an inclined slot 270 through which passes a pin 272 carried by the lower end of the link 152 and also extending through an approximately vertical slot 274 formed near the bottom of the upwardly extending shank 262 of the gripper jaw 260. The shank 262 of the gripper jaw 260 passes through a friction device 276 carried by the cylindrical portion 110 of the unit and comprising a substantially T-shaped member the head of which consists of a tubular portion 278 in which the shank 262 has a sliding fit. The stem of the T is mounted in a hole bored in the unit 110 for rocking movement about a substantially horizontal axis and houses a spring-pressed plunger 280 bearing upon the shank 262 and providing sufficient friction so that when the link 152 is moved upwardly the shank 262 and the gripper jaws will be held against upward movement until after the gripper jaws 260, 264 have closed upon the shoe upper. When, however, the gripper jaws can move toward each other no further, continued upward movement of the link 152 moves the gripper jaws bodily upwardly, notwithstanding the friction applied to the shank 262 of the gripper jaw 260, and the shoe upper is pulled upwardly as indicated at 282 in Fig. 23. This takes place immediately before the cover plate 226 of the throat member 178 wipes the shoe upper inwardly over the feather and into engagement with the rib of the insole 98, after which a staple is driven as indicated at 284 in Fig. 24 and the hold of the gripper jaws 260, 264 upon the shoe upper is released.

Transverse movement of the gripper jaws relatively to the upper-tensioning and stapling units is at all times limited to swinging movement about the substantially horizontal axis of the friction device 276 and the angular extent of this swinging movement is limited by surfaces 286, 288 formed upon side plates 130, 132, as best shown in Figs. 14 and 25.

The driving mechanism

Figure 32:
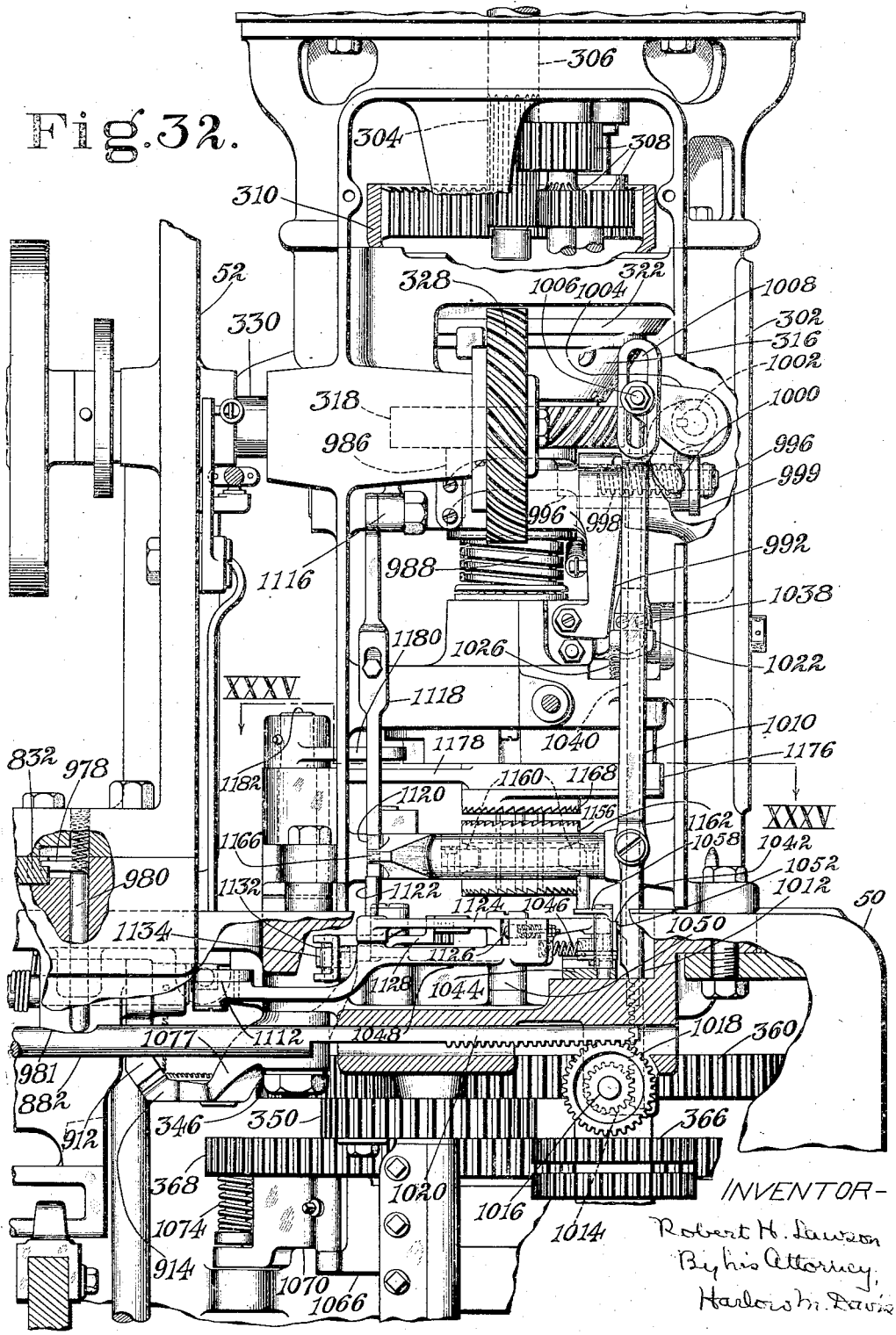
Fig. 32 is a front elevation and Fig. 33 a side elevation of controlling mechanism with which the machine is provided, including a stop motion arranged to cause the machine to operate through a predetermined number of cycles when it is started and then to come to rest.
Figure 33:
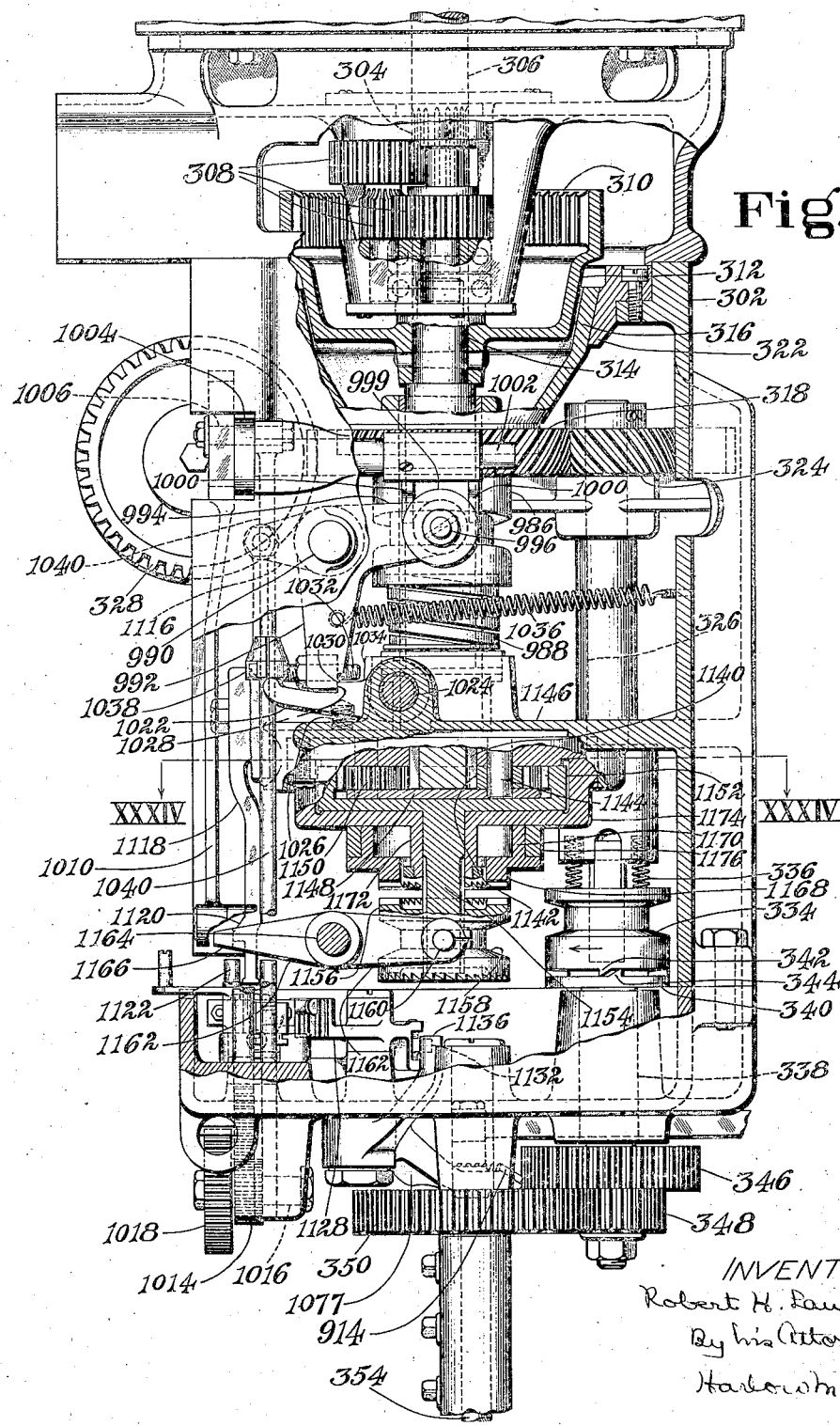

The power-operated parts of the machine are driven from a motor 300 (Figs. 1 and 2) mounted on top of the housing 302 (Figs. 1, 2, 32 and 33) of a controlling device and stop motion, the general organization of which is shown in Figs. 32 and 33. A spur gear 304 is formed upon or carried by the rotor shaft 306 of the motor 300 and is connected through a train of gears 308 with an internal ring gear 310 carried by a clutch member 312 fast on a vertical shaft 314 extending downwardly through the controlling device. Mounted upon the shaft 314 for sliding and rotary movement relatively thereto is a clutch member 316 having a skew gear 318 splined thereto for rotary movement therewith. A cam member 986 is rigidly connected to the clutch member 316. A brake member 322 is carried by the housing 302 in position to engage the clutch member 316 when the latter is in its lower or inoperative position as shown in Fig. 33. During the operation of the machine, however, the clutch member 316 is held in driving contact with the clutch member 312 by means hereinafter described and the gear 318 rotates, continuously driving with it a skew gear 324 (Fig. 33) mounted upon a vertical shaft 326 and another skew gear 328 mounted on a horizontal shaft 330 extending through a suitable opening in the wall of the housing of the controlling mechanism and through the head 52 of the machine, as shown in Figs. 1, 11, 12 and 13. It is this shaft 330 which operates the upper-tensioning and stapling mechanisms, as shown in Figs. 12 and 13.

Splined to the shaft 326 near the lower end thereof is a clutch member 334 spring-pressed downwardly, as shown in Fig. 33, by springs 336. Fast upon the upper end of a short vertical shaft 338 positioned in alinement with the shaft 326 is a co-operating clutch member 340, the two clutch members being provided with interengaging dogs 342, 344 each formed with a vertical and an inclined face so that the clutch will serve to transmit motion from the shaft 326 to the shaft 338 in a clockwise direction as viewed from above but will permit the shaft 338 to be moved in that direction without driving the shaft 326. When this takes place the inclined surfaces of the dogs 342, 344 engage each other, the clutch member 334 being forced upwardly against the compression of the springs 336 and permitting the dogs 344 of the clutch member 340 to pass the dog 342 of the clutch member 334.

Fast upon the lower end of the shaft 338 are two spur gears 346 and 348 (Fig. 33). The gear 348 meshes with a gear 350 fast upon the upper end of a shaft 354 (Figs. 3 and 8) which carries at its lower end a skew gear meshing with a skew gear 356 fast upon the shaft 92. Thus the shaft 92 is also driven as long as the clutch member 316 is in power-transmitting position.

The gear 346 meshes with a gear 360 fast upon the upper end of a vertical shaft 362 (Figs. 1 and 3). The shaft 362 has fast upon it a group of gears 366, any one of which may engage with a large vertically movable gear 368 mounted toward the rear of the machine for sliding and rotary movement upon a stationary vertical shaft 370.

*Connections from the driving mechanism to the stapling mechanism*

Fast upon the shaft 330, as shown in Fig. 13, is a cam member 380 provided with a pair of cam grooves 382, 384. A lever 386 is fulcrumed at 388 to the head 52 of the machine and provided at its rear end with a cam roll 390 positioned in the cam groove 384. The forward extremity of the lever 386 is pivoted at 392 to a cross-head 394 which is also pivoted at 396 to a lever 398 fulcrumed at 400 to the head 52 of the machine. The fulcrums 388, 400 are in vertical alinement as also are the pivots 392, 396 so that the cross-head 394 is maintained at all times horizontal as it is moved upwardly and downwardly by the rocking motion transmitted to the lever 386 by the cam member 380. The upper ends of the links 146 of the two stapling units are pivoted, as shown at 402, to the cross-head 394 so that the mechanism just described is operative to drive the staple forming and inserting mechanism.

*The pincer or gripper operating mechanism*

The mechanism for operating the grippers 136 of the lasting mechanism comprises a lever 410 also fulcrumed at 388 to the head 52 of the machine and rocked by a cam roll 412 positioned in the cam track 382 (Fig. 13). The forward extremity of the lever 410 carries the fulcrum 414 of a crooked lever 416, the rear extremity of which is pivoted to a downwardly extending rod 418 (Figs. 11 and 13), the lower end of which passes through an opening in the end of a substantially horizontal lever 420 fulcrumed at 421 to the frame 50 and formed of two parts 422, 424 pivotally connected at 426 and supported from the frame 50 of the machine by a spring 428. The part 422 of the lever 420 is yieldingly held in alinement with the part 424 by a spring 430 surrounding a rod 432 secured to the left-hand portion 424 of the lever 420. The spring 430 bears at one end upon the portion 422 of the lever 420 and at the other end upon a wing nut 434 threaded on the rod 432. The right-hand end of the portion 424 of the lever 420 is connected by a link 436 with a lever 438 fulcrumed at its rear end to the frame 50 and bearing a cam roll 440 engaging the surface of a cam 442 (Figs. 8, 11 and 13) mounted upon the shaft 92. The cam 442 is arranged to pull the portion 424 of the lever 420 downwardly against the action of the spring 428 and to hold it down during a portion of each revolution of the shaft 92. This downward movement takes place when the upper-tensioning and stapling units pass the forward end of the shoe and is operative, as hereinafter explained, to apply a greater tension to the shoe upper when operating along the ball and forepart of the shoe than while operating upon the shank.

A portion of the rod 418 is surrounded by a spring 444 bearing at its upper end against a bracket 446 carried at the top of the frame 50 and at its lower end against a washer 448 surrounding the rod 418 and supported against downward movement relatively to the rod 418 by a nut and lock nut 450. A similar washer 452 and nut and lock nut 454 are located at the lower extremity of the rod 418, the portion of the rod 418 between the nuts 450 and the washer 452 passing through a hole in the outer extremity of the part 422 of the lever 420. Thus, when the lever 420 is rocked downwardly by the cam 442, its extremity engages the washer 452 and pulls the rod 418 and the rear end of the lever 416 downwardly with a force transmitted through the spring 430. The spring 430 is much stiffer than the spring 444. As it is the spring 444 which limits the tension which can be applied to the shoe upper while operating along the shank and the spring 430 which limits the tension applied to the shoe upper while operating about the ball and forepart, the desired relatively light tension while operating along the shank and the heavy tension while operating along the ball and forepart are attained.

At its forward extremity the lever 416 is pivoted at 454 to a cross-head 456 (Fig. 13). The cross-head 456 is pivoted vertically above the pivot 454 to a link 458 which link, vertically above fulcrum 414, is pivoted to a lever 459 fulcrumed at 400 to the head 52, and to a link 460 pivoted also to levers 410 and 416 at 414. Thus, the cross-head 456 is maintained horizontal as it is moved up and down by the rocking of the levers 410 and 416. The cross-head 456 is connected at its extremities by the links 148 to the grippers 136 of the two upper-tensioning and stapling units.

*The transverse positioning of the shoe*

Figure 10:
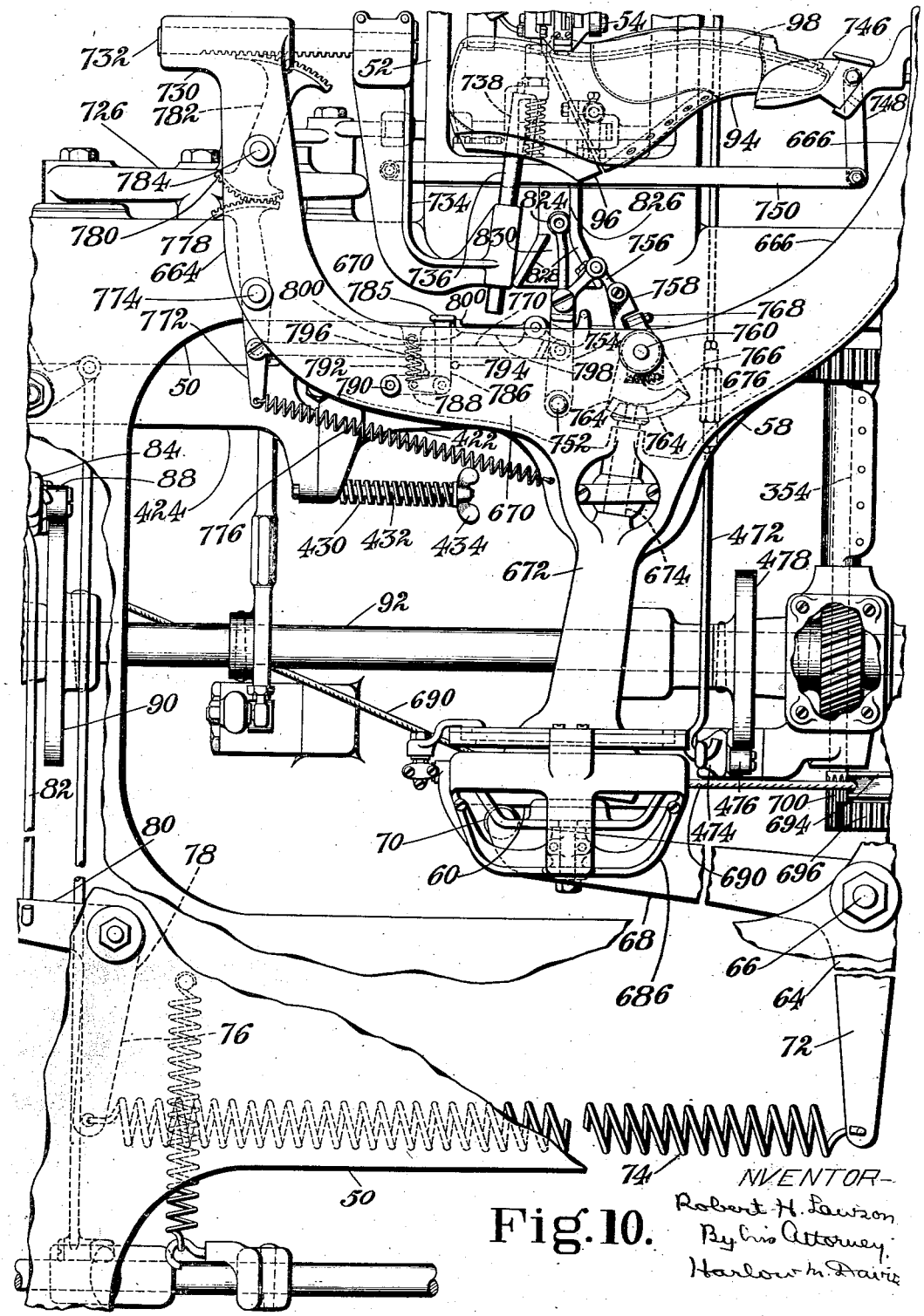
Fig. 10 is a view similar to Fig. 8 but showing the jack in the position which it occupies during the operation of the machine and showing more of the supporting means for the jack.

The presser feet 100, 102 serve not only to limit upward movement of the shoe and as anvils against which the staples are clenched, but also are utilized to position the shoe transversely, at all times after the jacking of the shoe is completed, being spring-held in engagement with the rib at opposite sides of the insole. For this purpose the bearing block 118 of the sleeve 116 of the rear upper-tensioning and stapling unit 56 is secured to the shaft 120 by a screw 462 (Fig. 16) and a downwardly extending lever or rock arm 464 (Fig. 12) is secured to the outer end of the shaft 120. A tension spring 466 is anchored at one end to the lower portion of the lever 464 and at the other end to the upwardly extending arm of a bell crank lever 468 fulcrumed at 470 to the head 52. A rearwardly extending arm of the bell crank lever 468 is connected by a link or rod 472 to a lever 474 fulcrumed at the rear to a stationary part of the machine and carrying a cam roll 476 engaging with a cam 478 fast upon the shaft 92 (Figs. 1 and 10). The cam 478 is formed to permit upward movement of the rod 472 under the influence of the spring 466 while operating along the shank portion of a shoe so that the presser feet 100, 102 will be pressed lightly against the rib of the insole while operating the shank. As the operation passes from the shank portion to the ball portion of the shoe, however, the rod 472 will be pulled downwardly by the cam 478 so that the spring 466 will move rearwardly, separating the presser feet 100, 102 and still holding them with a suitable pressure against the rib of the insole while operating upon the wider portions of the shoe.

*The mechanism for locking the upper-tensioning and stapling units against movement transversely of the shoe*

Locking mechanism indicated at 480 in Figs. 12 and 13 is provided to hold the upper-tensioning and stapling units 54, 56 solidly in position with the anvil surfaces of the presser feet 100, 102 against the rib of the insole at the time the staples are inserted. For this purpose the sleeves 116 of the upper-tensioning and stapling units 54, 56 are each provided with a squared lug 482 engaged by slots formed at the ends of rods 486 passing through openings formed in a block 488 carried by the head 52. A shaft 490 has a bearing in the block 488 and is provided with an eccentric portion 492 arranged, as the shaft is rotated, to be moved into and out of locking engagement with the rods 486. At its extremity, as shown in Fig. 12, the shaft 490 is provided with a rock arm 494 connected by a link 496 to the forward end of a lever 498 fulcrumed at 500 to the head 52 and anchored at its rear end to the head 52 by a tension spring 502. A cam 504 fast on the shaft 330 is arranged to engage a cam roll 506 mounted toward the rear end of the lever 498 so as to rock the lever once during each rotation of the shaft 330. The configuration of the cam 504 is such as to hold the eccentric portion 492 of the shaft 490 in locking engagement with the rods 486 and thus to hold the presser feet 100, 102 locked against the rear of the rib of the insole at the time the staples are inserted. On the other hand, after the staples have been driven, the rotation of the cam 504 permits the lever 498 to be rocked by the spring 502 thereby rocking the shaft 490 into such a position that the rods 486 are released and the upper-tensioning and stapling units 54, 56 can move to follow the contour of the rib of the insole under pressure exerted by the spring 466 as the shoe is fed.

*The wire-feeding means*

The two wires 225 from which the staples are formed are supplied from a pair of reels 512, 514 (Fig. 12) carried by a bracket 516 mounted upon the head 52 of the machine. From the reels 512, 514 the wires 225 pass through a pair of guides 518, 520 carried by a removable cap 522 which forms a portion of the casing of the head 52, and then downwardly to and through tubes 524 (Fig. 16) to feed rolls 526, 528 (Fig. 19), a pair of which are carried by each of the upper-tensioning and stapling units 54, 56. From the feed roll 526, 528 each wire passes through the corresponding tube 230 to its outlet 232 as already described.

As the means for operating the two pairs of feed rolls 526, 528 of the two staple inserting units 54, 56, shown in Figs. 16 and 17, are substantially identical except that they are rights and lefts, a description of one will suffice for the two. These feed rolls are driven from a cam 530 mounted at the left-hand side of the head 52 upon the shaft 330 to which is also secured a hand wheel 532 so that the shaft 330 may be rotated by hand when the machine is at rest as may be desirable, for example, when making adjustments. A roll 534 (Fig. 2) is positioned in the groove of the cam 530, being mounted upon the rear end of a lever 536 fulcrumed at 538 to the head 52 of the machine. A cross-head 540 is pivoted to the forward end of the lever 536, the two ends of the cross-head 540 being connected to a pair of slides 542 (Figs. 16 and 17) mounted for transverse movement in ways 544 formed in the shafts 122 about which the sleeves 116 rock. Fulcrumed at 546 to each sleeve 116 is a bell crank lever 548 having an upwardly extending arm provided with a ball-shaped end 550 located in a notch 552 formed in the slide 542. The other arm of the bell crank lever 548 extends transversely of the machine and terminates in a ball 554 positioned in a notch 556 formed in the upper end of a rod 558 mounted for vertical sliding movement in a way formed in the sleeve 116. At its lower end the rod 558 is connected to a rod 560 mounted for vertical sliding movement in a way carried by a block 562 secured to a side plate 132 of the upper-tensioning and stapling unit 54 or 56 as the case may be. The rods 558 and 560 are connected, as shown at 564, in such a manner that the upper-tensioning and stapling unit may have a considerable arcuate movement about an approximately vertical axis without interference by reason of the connection of the rods 558, 560 and without interfering with the transmission of endwise movement from the rod 558 to the rod 560.

At its lower end the rod 560 is provided with rack teeth 566 (Figs. 17 and 19) engaging a pinion 568 (Figs. 16 to 21) formed upon a short, substantially horizontal shaft 570 to which is clamped a finger 572 having pivoted at its outer end a pawl 574 cooperating with a ratchet 576 loose upon the shaft 570. A spring 578 is secured at one end to the arm 572 and at the other end to the pawl 574 thereby holding the pawl 574 in engagement with the ratchet 576. The feed roll 526 is secured to the ratchet 576 and to a gear 580 so that that group of parts can be rotated by the pawl 574, step-by-step, about the shaft 570, a bushing 582 surrounding the shaft 570 and providing a bearing for the ratchet 576 and the feed roll 526.

Another pinion 584, mounted upon a shaft 586 having a bearing in a block 588, meshes with the gear 580 and is rigidly connected to the feed roll 528 so that the two feed rolls are driven at appropriate speeds. The block 588 is secured to the block 562 by a stud 590 passing through a hole in the block 588 and threaded into the block 562, a spring 592 being interposed between the block 588 and a nut 594 threaded upon the stud 590. Thus it will be seen that rotation of the cam 530 is effective to reciprocate the rod 560 and thus to oscillate the pawl 574 thereby driving the feed rolls 526, 528 step-by-step and feeding appropriate lengths of wire to the staple forming and inserting units 54, 56.

*The turning means for the upper-tensioning and stapling units*

Means, which will now be described, is provided for turning the upper-tensioning and stapling units 54, 56 about axes extending approximately at right angles to the surface of the insole of the shoe operated upon thereby maintaining the shoe upper engaging surfaces of the gripper jaws substantially parallel to the shoe upper as they operate at different portions of the shoe upper and maintaining the line of drive of the staples substantially at right angles to the upwardly extending surfaces of the rib of the insole. As has already been pointed out, the upper-tensioning and stapling units 54, 56 are provided with approximately vertical cylindrical portions 110 mounted in correspondingly shaped and positioned sleeves 116, each of the cylindrical portions 110 having clamped to its upper end a collar 114. Each collar 114 is provided with a ball 600 to which is connected a link 602, 604 (Figs. 1, 12 and 13) extending transversely of the machine. The link 602, which controls the turning movement of the forward unit 54, is connected at its right-hand end to the forwardly extending arm of a bell crank lever 606 which lever is also provided with a transversely extending arm pivoted to a rearwardly extending link 608. At its rearward end the link 608 is connected to an arm 610 fast on the upper end of a vertical rock shaft 612 mounted in bearings carried by the head of the machine and having at its lower end a gear segment 614 meshing with a similar segment 616 (Figs. 6 and 12) secured to the upper end of a rock shaft 618. A spring 620 tends to move the link 608 forward thereby tending to rock the upper-tensioning and stapling unit 54 in a counterclockwise direction as viewed from above. A similar train of connections from the link 604 to a shaft 622 parallel and adjacent to the shaft 618 tends to move the upper-tensioning and stapling unit 56 in a clockwise direction as view from above.

Turning now to Fig. 3, it will be observed that the shafts 618 and 622 are provided near their lower ends with a pair of rock arms 624, 628 connected respectively by links 630, 632 to a pair of levers 634, 636. The levers 634, 636 are fulcrumed for turning movement upon the shaft 362 and are rigidly connected respectively to a second pair of levers 638, 640 (Fig. 1) also fulcrumed for turning movement on the shaft 362 and carrying at their extremities rolls engaging appropriately formed cam members of a bank of pattern cams 642 fast upon a hollow shaft 644 (Fig. 1) surrounding the shaft 370 and to the upper end of which the gear 368 is secured. The cams which engage the rolls of the levers 638, 640 are of such configuration as to turn the upper-tensioning and stapling units about their approximately vertical axes in such a way as to maintain the line of drive of the staples at all times substantially at right angles to the upwardly extending surfaces of the rib of the insole, the bank of cams being moved vertically by mechanism hereinafter described to bring different cams into engagement with the rolls of levers 638, 640, when shoes of a different style are to be operated upon or when passing from a right shoe to a left shoe.

*The jack supporting structur*

As already stated, a jack 58 is provided to carry the last 96 on which is assembled the shoe upper 94 and the insole 98 which are to be operated upon, as best shown in Figs. 6, 8 and 10. The jack 58 is connected to the forward end of the arm 60 by a gimbal joint shown in cross-section in Fig. 9. At its forward extremity the arm 60 is provided with a circular groove 650, the upper surface of which is formed by an annular plate 652 (Figs. 2, 3 and 6). In this groove 650 is positioned the flange of a ring 654 to which the base portion 656 of the jack is secured by a gimbal joint of usual construction so that the jack 58 can have universal rocking movement to a limited extent. An arm 658 is secured to the forward end of the arm 60 and is pivotally connected to a rearwardly extending link 660, the rear end of which is connected to an arm 662 rigid with the bracket 62 so that the movement of the longitudinal axis of the shoe, as the jack is moved, will be parallel and there will be no turning of the shoe about a vertical axis.

The jack

The jack 58, as clearly shown for example in Fig. 8, has an upper approximately U-shaped portion having two arms 664, 666 connected by an approximately horizontal portion 670 from which a hollow spindle 672 extends downwardly to the base 656. Housed within the spindle 672, and having appropriate bearings therein, is a shaft 674 having a bevel gear 676 fast upon its upper end. At its lower end the shaft 674 is connected by a universal joint 678 (Fig. 9) to a dish-shaped pulley 680 mounted for rotary movement, through a ball bearing 682, on a short, vertical shaft 684 carried at the center of a spider 686 secured to the outer end of the arm 60. The pulley 680 is provided with a groove 688 about which passes a cable 690 which extends rearwardly through the arm 60, as shown in dotted lines in Fig. 3. One end of the cable 690 passes about a small pulley 692 carried by the arm 60 and then to the right about a larger pulley 694 to which the end of the cable is secured. The pulley 694 is rigidly secured to a spur gear 696, the two being mounted upon a short shaft 698 carried by the base 50 near the front, right-hand corner of the machine, as shown in Figs. 1 and 3. The gear 696 meshes with a pinion 700 fast upon the lower end of the shaft 354 (Figs. 8 and 10).

The other end of the cable 690 also extends rearwardly through the arm 60, crossing the end which has already been described, and passes about a small pulley 702 carried by the arm 60. From the pulley 702 the cable 690 passes rearwardly and to the left and then downwardly about a pulley 704 (Figs. 1 and 3) and beneath a pulley 706 secured to a weight 708. From the pulley 706 the cable 690 passes upwardly and is connected to the end of a chain 710 which continues upwardly and about a pulley 712 carried by the frame 50, then horizontally forward, about a pulley 714 carried by a bracket 716 secured to the base 50, then forwardly about a pair of pulleys 718, 720 carried by a lever 722, known as the "fulcrum lever" and which forms part of a pantograph mechanism hereinafter described, and then to the left to an anchorage 724 on a horizontal lever 726 (known as the "feed lever") the rear end of which is fulcrumed at 728 at the rear left-hand side of the machine for horizontal swinging movement. By referring to Fig. 3, it will be apparent that rotation of the pulley 694 in a clockwise direction, as viewed from above, will rotate the shaft 674 also in a clockwise direction, and will lift the weight 708. Similarly, the weight 708 will rotate the shaft 674 in a counter-clockwise direction when permitted so to do by the disconnection of the clutch 334, 340 which is accomplished, after the lasting of a shoe is finished, by means hereinafter described.

The upper end 664 of the U-shaped portion of the jack 58 is provided with a horizontal, transversely extending sleeve 730 (Figs. 6, 8 and 10) forming a guideway for a rack bar 732 to the forward end of which is secured, for rocking movement about the axis of the rack bar 732, the longer arm of an approximately U-shaped member 734. The shorter, upwardly extending arm 736 of the member 734 is reduced at its upper extremity to form a last pin 738. The upwardly extending arm 736 of the member 734 is counterbored to receive a plunger 740 pressed upwardly by a spring 742 (Fig. 8) housed in a hollow portion of the plunger and bearing at its lower end against a pin 744 carried by the member 734 and extending through a slot in the wall of the plunger.

Pivoted to the upper end of the arm 666 of the jack 58, for horizontal movement about a transverse axis, is a toe rest 746, the toe rest 746 being connected with the member 734 by two angularly related links 748, 750 so that the member 734 and the last pin 738 may move toward and from the toe rest 746 but the toe rest 746 and the last pin 738 are at all times maintained in alinement with each other and their angular relation to each other can not change.

Fulcrumed at 752 to the approximately horizontal portion 670 of the jack 58 is a lever 754 extending upwardly and connected by a toggle 756 with a lever 758 fulcrumed at 760 to the portion 670 of the jack 58. Another lever 762 is also fulcrumed at 760, extending in the opposite direction from the lever 758 and having at its lower end a bevel gear sector 764 meshing with the bevel gear 676. A spring 766 connects the two levers 758 and 762 while an adjustable stop screw 768 limits the movement of the two levers under the action of the spring. Thus the levers 758 and 762 normally act as a single lever, the spring 766 serving as a safety device.

A link 770 is connected at one end to the lever 754 approximately half way between its fulcrum 752 and the toggle 756 and is connected at the other end to the lower arm of a lever 772 fulcrumed at 774 to the jack 58 and urged in a counterclockwise direction, as viewed in Fig. 8, by a tension spring 776 anchored at one end to the lever 772 and at the other end to the spindle 672 of the jack 58. At its upper end the lever 772 is formed with a gear segment 778 meshing with a gear segment 780 formed at the lower end of a lever 782 fulcrumed at 784 somewhat above the median portion of the arm 664 of the jack 58. At its upper end the lever 782 is provided with another gear segment meshing with the rack of the rack bar 732. Thus the spring 776 tends to urge the rack bar 732 and the last pin 738 toward the toe rest 746, but this movement is resisted when the machine is at rest by the toggle 756 which at that time is in a straightened condition and must be broken before the last pin 738 can move toward the toe rest 746.

When a last is placed upon the last pin 738, with the toe portion of the last in the toe rest 746, the plunger 740 is depressed against the action of the spring 742. The lower end of the plunger 740 bears upon the top of a table 785 carried by the upwardly extending arm of a small bell crank lever 786 fulcrumed at the forward extremity of a link 788 (Figs. 8 and 10) pivoted at 790 to the horizontal portion 670 of the jack 58. A spring 792, connected at one end to the horizontally extending arm of the bell crank lever 786 and at the other end to the horizontal portion 670 of the jack 58, tends to lift the horizontally extending arm of the bell crank lever 786 and at the same time to rock that lever in a clockwise direction, as viewed in Fig. 8, into engagement with a stop pin 794 carried by the jack 58. A second pin 796 serves to limit the upward movement of the link 788 under the influence of the spring 792.

Fulcrumed near the forward extremity of the link 770 is a lever 798, one end of which is turned upwardly at 800 to bear against the lower surface of the table 785 and the other end of which is turned upwardly at 801 beneath the toggle 756. When the plunger 740 is forced downwardly by the placing of a last in the jack 58, the bell crank lever 786 is depressed bodily, rocking the lever 798 in a counterclockwise direction, as viewed in Fig. 8, and causing the right-hand end of the lever 798 to move upwardly engaging and breaking the toggle 756. This permits the spring 776 to move the rack 732, the U-shaped member 734 and the last pin 738 to the right until the toe of the shoe on the last engages the toe rest 746. This cramps the last on the last pin and prevents further movement of the last pin to the right. At this time the parts of the jack 58 are in the condition shown in Fig. 10.

*The work-feeding means*

Means, which will now be described, is provided for moving the jack 58 to the left, transversely of the machine, to present a shoe upon a last carried by the jack to the upper-tensioning and stapling instrumentalities of the units 54, 56. For this purpose the upper end of the forward arm 666 of the jack 58 is connected by a link 810 to the forward end of the feed lever 726. (See particularly Figs. 3 and 6.) The median portion of the lever 726 is connected by links 812 and 814 to the rearwardly extending end of a large horizontal bell crank lever 816 fulcrumed at 818 near the top of the base 50 of the machine. The forward arm of the bell crank lever 816 carries a cam roll 820 bearing against a cam 822 at the upper end of the bank of cams 642 and held in engagement with the cam 822 by the weight 708. The cam 822 is of such a configuration that as it rotates the lever 726 moves step-by-step from right to left, in a clockwise direction as viewed in Fig. 3, thereby feeding the jack step-by-step to the left, the upper tensioning and stapling mechanism of the units 54, 56 operating upon the shoe during the pauses between the successive steps of feeding movement. It should be noted, however, that in order to insure the absence of wrinkles in the shoe upper in the neighborhood of the heel breast line where the lasting operation is started, the cam 822 may be made of such a configuration as to cause a short feeding step after the grippers 136 have seized and tensioned the upper but before the first staple is inserted. Except for this first cycle of operation of the upper-tensioning and stapling mechanism, the machine operates to cause the grippers 136 to grip and tension the shoe upper and then to insert a staple through the shoe upper and into the rib of the insole without intervening feeding movement.

In order to control the feeding movement of the jack 58 in accordance with the size of the shoe operated upon so that the lasting operation may be performed in an unvarying number of cycles irrespective of the size of the particular shoe operated upon, pantograph mechanism is provided, controlled by the size of the shoe placed in the jack 58. In order to set the pantograph mechanism, which is of the same type as that disclosed in my co-pending application Serial No. 637,749, the lever 754 of the jack 58 carries at its upper end a ball 824 (Figs. 6, 8, 10 and 13) arranged to engage against a surface 826 to which it is led by a pair of converging ribs 828 formed on a plate 830 at the end of a rod 832 mounted for forward and rearward sliding movement in guides carried by or formed in the top of the base 50 of the machine. The lengthwise movement of the rod 832 is controlled by mechanism hereinafter described. For present purposes, it is sufficient to note that after the shoe has been placed in the jack, the operator takes hold of the jack and swings it rearwardly, bringing the ball 824 into position between the ribs 828 and then permitting it to rise under the influence of the spring 74 into engagement with the surface 826. As the position of the ball 824 varies according to the length of the shoe in the jack, the position of the jack transversely of the machine is controlled in accordance with the size of the shoe. The larger the shoe the further the front arm 666 of the jack 58 will be moved to the right and the shorter the shoe the further to the left. Thus, on account of the connection between the jack 58 and the feed lever 726, the position of the feed lever 726 at the time the machine is started will depend upon the size of the shoe in the jack and the larger the shoe the further the forward end of the lever 726 will be swung to the right.

The pantograph mechanism

The pivotal connection between links 812 and 814 (Fig. 3) is connected by a link 834 to a point near the rearward end of the fulcrum lever 722 which, it will be remembered, is pivoted at its forward end for horizontal swinging movement to the underside of the top of the base 50. The extreme rearward end of the fulcrum lever 722 is pivoted to a rod 838 mounted for sliding movement in a sleeve 840 fulcrumed at 842 to the rear of the base 50 and carrying a pair of pivoted dogs 844 arranged, when swung in one direction, to clamp the rod 838 in the sleeve 840 and, when swung in the other direction, to release the rod 838 for sliding movement in the sleeve 840. The dogs 844 are normally held in position to clamp the rod 838 to the sleeve 840 but are moved to releasing position for an instant as the machine is started so as to permit the relation of the rod 838 to the sleeve 840 and consequently the position of the fulcrum lever 722 and the position of the link 834 to be varied according to the length of the shoe in the jack. For this purpose the forward ends of the dogs 844 are provided with pins 846 engaged in slots formed in the ends of a bar 848 pivoted to a forwardly extending sleeve 850 (Fig. 3) in which is housed a spring 852 bearing at its forward end against an internal shoulder formed at the end of the sleeve 850 and at its rearward end against a shoulder formed on a rod 854 which passes through the spring 852 and the sleeve 850 and is pivoted at its forward end to the right-hand end of a horizontal swinging lever 856 fulcrumed beneath the top of the base 50 and connected intermediate its ends by a link 858 with the left-hand end of a lever 860 also fulcrumed beneath the top of the base 50. While the machine is in operation the lever 860 is held latched in the position shown in Fig. 3 by a spring-held latch 862 which engages a lug 864 formed on the lever 860. When, however, the jack 58 is moved into operative position preparatory to the starting of the machine, the latch 862 is swung in a counterclockwise direction, as viewed in Fig. 3, by mechanism hereinafter described, thus releasing the lever 860 and permitting the rod 854 to move rearwardly thereby releasing the tension of the spring 852. This permits rearward movement of the bar 848, a light tension spring 866 being connected at one end to the middle of the bar 848 and at the other end to the base 50 of the machine back of the bar 848 in order to insure sufficient rearward movement of the bar 848 to release the dogs 844. This releases the rod 838 from the sleeve 840 and permits the fulcrum lever 722 and consequently the link 834 and the connection between the links 812 and 814 to move to the positions necessary for the operation upon the particular shoe in the jack 58. Mechanism for then operating the dogs 844 to latch the rod 838 to the sleeve 840 is operated by the subsequent depression of the treadle 870 which also starts the operation of the upper-tensioning and stapling and the jack feeding mechanisms.

The treadle connections

The treadle 870 of the machine is shown in Figs. 1, 2 and 3. It is fulcrumed at 872 and is normally urged in an upward direction by a spring 874 anchored at one end to the treadle and at the other end to the base 50. The treadle 870 is connected through a vertical rod 876 with a bell crank lever 878 at the upper left-hand front corner of the base 50. The bell crank lever 878 is connected by a link 880 with the left-hand end of a slidably mounted rod 882 (Figs. 1, 3, 11 and 32) extending transversely of the machine and provided with an upstanding pin 884 (Fig. 3) which serves, when the treadle is not depressed, to limit upward movement of the treadle under the action of the spring 874 by engagement with a lug 885 formed on the under side of the top of the base 50. When the treadle is depressed, however, the pin 884 moves to the right and engages the lever 860, which at that time extends forwardly across the rod 882 by reason of the previous release of the latch 862. The movement of the pin 884 to the right returns the lever 866 to the position in which it is shown in Fig. 3, thus swinging the right-hand end of the lever 856 forwardly and causing the dogs 844 to clamp the rod 838 to the sleeve 840 by tension applied through the spring 852. The means for controlling the dogs 844 remains in this condition until the lasting operation is completed, the shoe removed from the machine, another shoe placed in the jack and the jack moved to bring its ball 824 into engagement with the surface 826.

More about the jack-supporting and controlling mechanism

In order to limit forward movement of the jack 58 when the machine is at rest, the spindle 672 of the jack is connected by a universal joint 888 with a rearwardly extending rod 890 (Figs. 2, 3 and 13) to which is secured the front end of a tension spring 892 which is anchored to the rear of the base 50 of the machine. At its extreme rear end the rod 890 is pivoted to the free end of a link 894 (Fig. 2) pivoted at its lower end to the bracket 62 for vertical swinging movement. Forward movement of the rod 890 is limited by a nut and lock nut 896 threaded upon a rod 898 which is anchored at its rear end to the base 50 and passes through a hole in the upper end of the link 894. Adjustably clamped by a screw and slot connection to the median portion of the rod 890 is a plate 900 having near its forward end an upwardly extending rearwardly curved finger 902 arranged, when the machine is at rest, to be hooked about a longitudinally slotted lever 904 (Figs. 2, 11 and 13) pivoted at 905 (Fig. 11) to the lower end of a spring-held lever 906 fulcrumed for vertical swinging movement about a short horizontal shaft 908 near the top of the base 50. A spring 910, coiled about the shaft 908 and anchored at one end to the shaft and at the other end to the base 50 of the machine, tends to rotate the lever 906 in a counterclockwise direction, as viewed in Fig. 13, on the shaft 908, the lever 906, however, being rocked to a depending position, as shown in Figs. 11 and 13, by motion transmitted through a gear sector 912 fast upon the shaft 908 and provided with a pin 913 (Figs. 3 and 34) arranged, as the gear sector 912 moves in a downward and forward direction, to engage the lever 906 and force it in a clockwise direction as viewed in Fig. 13 into depending position. The lever 906 is oscillated by a gear sector 914 oscillated by mechanism hereinafter described as the machine comes to rest after the performance of the lasting operation upon a shoe.

The lever 906 is held latched in depending position while the machine is at rest by a latch 916 (Fig. 13) pivoted at 918 to the lever 906 and pressed by a spring 920 in a counterclockwise direction, as viewed in Fig. 13, being thereby held in engagement with a stationary latch member 922 carried by the base 50 of the machine. The latch 916 is of a right angular formation with its pivot 918 at the end of one of the arms. The junction point of the two arms of the latch 916 is connected by a link 924 with the slotted lever 904. By reference to Fig. 13 it will be observed that the relation of the engagement of the latch members 916 and 922 to the fulcrum 908 of the lever 906 is such that the latch 916 is effective to prevent counterclockwise swinging movement of the lever 906 when the machine is at rest with the parts in the position shown in that figure. On the other hand, downward pressure exerted on the jack 58 by the operator is effective to lower the free end of the lever 904 sufficiently to disengage the latch 916, 922, thereby permitting the lever 906 to fly up in a counterclockwise direction under the influence of its spring 910. The operator moves the jack 58 downwardly for this purpose against the tension of the spring 74 after he has placed a shoe in the jack and in order to permit rearward and upward movement of the jack, which, until the lever 906 is released, is held against both rearward and upward movement by the engagement of the finger 908 about the lower bar of the slotted lever 904. After the lever 906 flies up, the ball 824 is moved into engagement with the plate 830 between the ribs 828, being moved upwardly by the spring 74 and the bell crank lever 64, thereby bringing the ball 824 into engagement with surface 826. Excessive upward movement of the jack is prevented by the engagement of the presser feet 100, 102 with the insole of the shoe.

*The measuring means for positioning the presser feet*

In order that the presser feet 100, 102 may engage the insole properly between the ribs of the insole as the jack is moved upwardly, means is provided for positioning the presser feet 100, 102 in accordance with the size of the shoe in the jack. For this purpose a lever 926, having at one end a cam surface 928 (Fig. 6) and at the other end a roll 930, is fulcrumed at 932 to the top of the base 50. The roll 930 is positioned in a slot formed in a plate 934 secured to the feed lever 726, the rearward wall of the slot diverging at the right-hand end from the forward wall so as to guide the roll 930 into the slot as the lever 726 is swung to the right. As the position of the lever 726 is varied in accordance with the size of the shoe placed in the jack, the angular position of the slot and the plate 934 will be varied and the position of the lever 926 will, accordingly, be varied. Engaging the cam surface 928 is a roll 936 formed at the right-hand end of a rod 938 mounted for transverse sliding movement in the head 52 of the machine. Rocking movement of the lever 926 is limited by a pair of pins 940 carried at the right-hand end of the lever 926. The right-hand end of the rod 938 is pivoted to a link 942 which, together with a second link 944, forms a toggle connection between the rod 938 and a rock arm 946 fast upon a vertical shaft 948 (Figs. 6 and 12), the upper end of which bears a rock arm 952 pivoted to a forwardly extending rod 954, the forward end of which is pivoted to the lower end of the lever 464. Thus it will be seen that when a shoe is jacked and the toggle 942, 944 is in straightened condition, the position of the lever 464, and consequently the spacing of the presser feet 100, 102, is determined by the size of the shoe in the jack 58.

The toggle 942, 944 is normally broken, as shown in Fig. 7, while the machine is in operation so that the position of the lever 726 has no effect on the position of the presser feet 100, 102 and the upper-tensioning and stapling units 54, 56, the presser feet being urged apart by the spring 466 and being positioned by the rib of the insole. The machine, however, comes to rest with the toggle 942, 944 straightened, so that when the jack is moved rearwardly and the ball 824 is brought into engagement with the surface 826 the presser feet 100, 102 are positioned in accordance with the size of the shoe in the jack. For this purpose the shaft 908 is provided with an arm 956, shown as extending toward the rear in Fig. 13, and connected by a link 958 with the median portion of a lever 960 (Fig. 13) fulcrumed at the top of the base 50 of the machine. At its upper end the lever 960 is provided with a pin 962 arranged for engagement with a hook 964 carried by an upwardly extending bracket 966 clamped to the slide member 832 and normally urged in a counterclockwise direction, as shown in Fig. 13, by a spring 968. Also connected to the upper end of the bracket 966 is a forwardly extending rod 970 guided in its forward and rearward movements by an eye 972 carried by the top of the base 50 of the machine. Clamped to the rod 970 are two collars 974, 975, one in front and the other behind the toggle 942, 944 so that rearward movement of the rod 970 and the slide 832 from the position shown in Fig. 6 to the position shown in Fig. 7 will break the toggle 942, 944, and forward movement of the rod will straighten the toggle. The slide 832 is urged rearwardly by a spring 976 (Fig. 2) and the machine comes to rest with the toggle 942, 944 straightened, as shown in Figs. 6 and 13, and with the rearward collar 975 in contact with the straightened toggle, the slide 832 being latched in the position shown in those figures by the transversely extending end 978 of a vertically sliding spring-pressed latch 980 (Figs. 13 and 32), the lower end of which bears upon a cam surface 981 formed upon the rod 882, as shown in Fig. 11. The arrangement is such that, when the machine is at rest, the latch member 980 is in its lowermost position with its end 978 engaged in a notch formed in the slide bar 832. When, however, the treadle 870 is depressed and the rod 882 moved to the right, the latch 980 is moved upwardly by a cam surface 981 formed on the bar 832 against the action of its spring, releasing the slide bar 832 which is moved rearwardly by the spring 976, causing the forward collar 974 to break the toggle 942, 944, thus breaking the connection between the feed lever 726 and the presser feet operating mechanism. It should be noted, however, that before this takes place, the presser feet have been positioned by the measuring movement of the lever 726 to a position determined by the size of the shoe in the jack so that they will engage the insole of the shoe just back of its rib in the neighborhood of the heel breast line and, when the toggle 942, 944 is broken, will be urged by the spring 466 into engagement with the rib. When the gear sector 912 is rocked to swing the lever 906 into dependent position, the arm 956 carried by the shaft 908 moves approximately 90 degrees in a clockwise direction from the position shown in Fig. 13, rotating the lever 960 through the link 958 in a counterclockwise direction and causing the pin 962, which at that time is in engagement with the hook 964, to pull the slide 832 and the rod 970 into their forward position, as shown in Fig. 13, the slide 832 being latched in that position by the spring latch 980. It is this forward movement of the rod 970 which causes the collar 975 to engage and straighten the toggle 942, 944, leaving the parts in such position that a shoe subsequently jacked is operative to determine the position of the presser feet 100, 102.

*The means for tilting the jack longitudinally of the shoe*

The illustrated machine is provided with means for tilting the jack 58 transversely of the machine and longitudinally of the shoe in the jack to maintain the portion of the insole of the shoe, adjacent to which the lasting is being performed, at all times in a horizontal plane so that the gripper jaws 136 will pull the upper stock in a direction heightwise of the last and substantially normal to the insole and so that the staples will be inserted through the upper and into the rib of the insole with their bars parallel to the surface of the insole. For this purpose the arm 60 is pivoted toward its forward end to a link 982 the other end of which is pivoted to a lever 984 (Figs. 1 and 3) fulcrumed on the shaft 362 and having at its other extremity a cam roll engaging one of the cams of the bank of cams 642. It may be seen by referring to Fig. 1 that, assuming the upper end of the arm 666 of the jack 58 remains stationary, movement of the link 982 to the left will rock the shoe in a clockwise direction substantially about a point adjacent to its toe end thus changing the angular relation of any given portion of the surface of the insole to the horizontal. The configuration of the cam which controls the tilting of the shoe for any particular shoe bears such a relation to the feed cam that this tilting movement of the shoe maintains the portion of the insole adjacent to the presser feet 100, 102 at all times horizontal.

*The controlling mechanism or "stop motion"*

The controlling mechanism by which the machine is started and stopped (frequently spoken of as a "stop motion") and the means for returning the jack after the completion of the lasting operation will now be described. Referring particularly to Figs. 32 and 33, it will be seen that the cam 986 is rigidly connected to the clutch member 316, a stiff spring 988 tending to lift the cam 986 and the clutch member 316 so as to bring the clutch member 316 into driving relation to the clutch member 312. Fulcrumed to the housing 302 at 990 is a bell crank lever 992 having a rearwardly extending arm 994 in which is mounted for longitudinal sliding movement a locking bolt 996, the inner end of which is caused to enter a groove of the cam 986 when the machine is to be brought to rest. A spring 998 surrounds the locking bolt 996, bearing at one end against a shoulder formed on the locking bolt and at the other end against an internal shoulder formed near the end of the rearwardly extending arm 994 of the bell crank lever 992. Near the outer end of the locking bolt 996, on the side of the arm 994 remote from the cam 986, is a disk 999 in position to be engaged by a pair of curved fingers 1000 (Fig. 32) carried by a rock shaft 1002 fulcrumed to the housing 302 and bearing also a rock arm 1004, near the left-hand extremity of which is a pin 1006 extending into a slot 1008 formed in the upper end of a vertical rod 1010, the lower end of which is secured to a rack rod 1012, the rack teeth of which mesh with a pinion 1014 fast upon a short shaft 1016 to which is also secured a pinion 1018 meshing with rack teeth 1020 formed upon the right-hand end of the rod 882. When the machine is at rest, the end of the locking bolt 996 is contained in the groove of the cam 986 and the cam 986 is in such a position as to hold the spring 988 compressed and the clutch member 316 out of engagement with the clutch member 312 and in engagement with the brake member 322, as shown in Fig. 33. The pin 1006 at this time is well below the upper end of the slot 1008 and the curved fingers 1000 are spaced somewhat from the disk 999. A latch member 1022 is fulcrumed at 1024 to the housing 302, being urged in a clockwise direction, as viewed in Fig. 33, by a spring 1026. The latch member 1022 is provided with a shoulder 1028 arranged in the path of movement of a corresponding shoulder 1030 formed at the lower end of the depending arm of the bell crank lever 992 in which arm is also threaded an adjustable stop screw 1032 arranged to limit the rearward swinging movement of the lower end of the depending arm of the bell crank lever 992 by engagement with a surface 1034 formed on a stationary part connected to the housing 302. A spring 1036 tends to rock the bell crank lever 992 in a counterclockwise direction, as viewed in Fig. 33, that is, to move the lower end of the depending arm of the bell crank lever 992 rearwardly.

When the machine is at rest, the shoulder 1028 of the latch member 1022 is engaged by the shoulder 1030 of the bell crank lever 992, as shown in Fig 33, the spring 988 urging the lower surface of the groove of the cam 986 forcibly against the inner end of the locking bolt 996. In order to facilitate the withdrawal of the locking bolt 996 from the groove of the cam 986, means is provided for releasing the bell crank lever 992 from the latch 1022, thus permitting the bell crank lever 992 to rock in a counterclockwise direction, as viewed in Fig. 33, under the force applied to it by the spring 988 through the cam 986 so that the locking bolt 996 may be easily withdrawn without the application of excessive force. For this purpose the left-hand end (Fig. 33) of the latch member 1022 is engaged by a collar 1038 fast upon a vertical rod 1040 mounted for vertical movement and secured at its upper end to the pin 1006. Thus it will be seen that depression of the treadle 870, which is effective to lower the rod 1010, causes the rock arm 1004 and the curved fingers 1000 to move in a counterclockwise direction, as viewed in Fig. 32, this motion first causing the collar 1038 to impinge upon and to release the latch 1022, and then causing the fingers 1000 to contact with the disk 999, moving that disk to the right, as viewed in Fig. 32, and withdrawing the locking bolt 996 from the groove of the cam 986. The release of the latch 1022 permits the spring 988 to move the clutch member 316 into driving engagement with the clutch member 312 so that the machine is started.

Before the operator depresses the treadle, however, he seizes the jack 58, which at that time has a shoe in it, and forces it downwardly, thus releasing the latch 916 and permitting the lever 906 to be swung upwardly by its spring 910 so that the operator can move the jack inwardly toward the base 50 of the machine to bring the ball 824 into position between the ribs 828 of the plate 830 and then upwardly under force applied by the spring 74 into engagement with the surface 826, thereby positioning the feed lever 726 in accordance with the size of the shoe in the jack and setting the pantograph mechanism so that the feeding movement imparted to the jack 58 will be appropriate for that particular shoe. It will be remembered that the setting of the lever 726 is also effective to control the spacing of the presser feet 100, 102 through the toggle mechanism 942, 944 and mechanism associated therewith.

When the operator depresses the treadle 870 the rod 882 is moved to the right, releasing the latch 980 so that the bar 970 and the slide bar 832 can move to the right, breaking the toggle 942, 944 and swinging the lever 860 in a counterclockwise direction, as viewed in Fig. 3, thereby clamping the bar 838 of the pantograph mechanism to the sleeve 840 so as to secure the fulcrum lever 722 of the pantograph mechanism in adjusted position. This takes place during the earlier part of the downward movement of the rod 1010 and before the upper portion of the slot 1008 engages the pin 1006 and, therefore, before the withdrawal of the locking bolt 996 and the starting of the upper tensioning and stapling mechanism.

The rod 1040 is held latched in its lower position during the performance of the lasting operation in order to hold the locking bolt 996 withdrawn from the cam 986. For this purpose a latch member 1042 (Figs. 34 to 38, inclusive) is mounted in ways 1044 carried by the base 50 of the machine for sliding movement toward and from the lower end of the rod 1040. A compression spring 1046 bearing at one end against the latch member 1042 and at the other end against a lever 1048 fulcrumed at 1050 to the top of the base 50 of the machine urges the latch member 1042 toward the rod 1040 which is provided with a lug 1052 having a lower inclined surface arranged to press the latch member to the left (Figs. 36 and 37) against the compression spring 1046 as the rod 1040 is moved downwardly and finally to pass beneath the lower surface of the latch member 1042, the spring 1046 moving the latch 1042 to the right over the lug 1052, and thus holding the rod 1040 latched in its lowered position. The latch member 1042 is provided with a pair of inclined surfaces 1054 (Fig. 38) engaging a pin 1056 depending from the right-hand end of the lever 1048 so that rocking of the lever 1048 will be effective to force the latch member 1042 to the left, releasing the rod 1040. A manually operated releasing device is also provided, comprising a lever 1058 fulcrumed at 1060 adjacent to the latch member 1042 and having a rearwardly extending arm 1062 engaging the latch member 1042 so that rocking of the lever 1058 in a counterclockwise direction, as viewed in Figs. 34 and 38, will force the latch member 1042 to the left, thus releasing the rod 1040 and thereby releasing the locking bolt 996 so that it may be moved by the spring 998 into engagement with the cam member 986. This mechanism permits the machine to be stopped manually at any time and is useful if for any reason the machine fails to function properly.

In the normal operation of the machine, the lever 1048 is rocked in a counterclockwise direction, as viewed in Fig. 34, at the conclusion of the lasting operation by mechanism which will now be described.

Figures 4, 5:
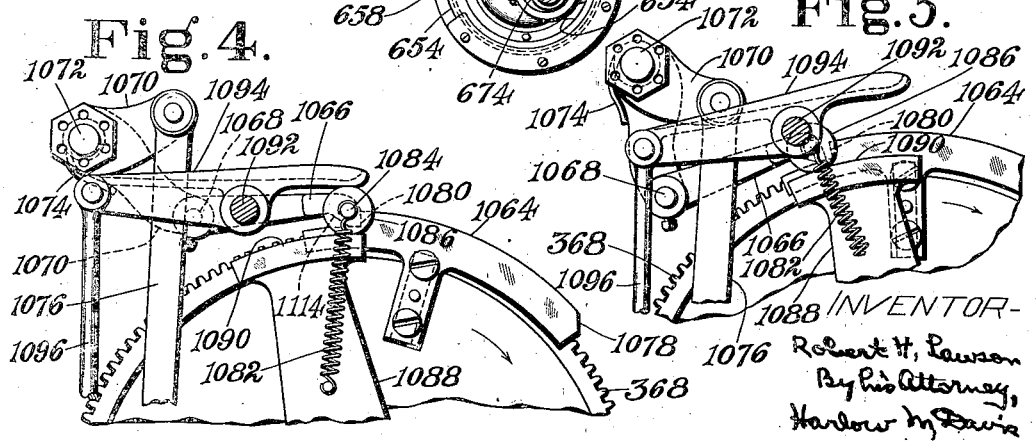
Figs. 4 and 5 are detail views on a larger scale than Fig. 3 showing portions of the mechanism which are used to return the jack with which the machine is provided to starting position after the conclusion of the lasting operation upon a shoe.

The machine is so organized that the gear 368 makes somewhat less than one complete revolution during the performance of the lasting operation upon a shoe, the revolution being completed as the jack 58 is returned to its initial position. Attached to the gear 368 is a cam 1064 with its forward end, at the right in Figs. 3 and 4, arranged, as the gear 368 nears the completion of each revolution, to engage the right-hand end of a finger 1066 pivoted at 1068 to the end of the forward arm of a bell crank lever 1070 fulcrumed at 1072 to the rear wall of the base 50 near the top of the base and urged in a counterclockwise direction, as viewed in Figs. 3, 4 and 5, by a spring 1074. The cam 1064 passes through the slot between two of the gears 366 as the gear 368 rotates, and it is for this reason that the gears 366 are spaced apart. Pivoted to the rearward arm of the bell crank lever 1070 is a link 1076 the forward end of which, as shown in Figs. 3 and 34, is pivoted to a lever 1077 which carries or forms part of the gear sector 914. The end of the finger 1066 is hook-shaped, as shown in Fig. 4, and is of sufficient thickness, measured vertically, to engage the cam 1064 regardless of the vertical adjustment of the bank of cams 642. The forward end of the cam member 1064 is inclined, as shown at 1078 in Fig. 4, while the rear end of the cam 1064 is formed with an abrupt shoulder 1080.

The right-hand end of the finger 1066 is urged forwardly by a tension spring 1082 attached at one end to a pin 1084 which serves to support a roll 1086 carried by the end of the finger 1066 and anchored at the other end to a stationary arm 1088 secured to the top of the base 50 and having at its rear end a track 1090 against which the roll 1086 bears. Fulfrumed at 1092 to the finger 1066 is a lever 1094 the right-hand end of which normally bears against the roll 1086 diametrically opposite to the track 1090. The left-hand end of the lever 1094 is pivoted to a forwardly extending rod 1096, the forward end of which passes through an oversized hole in a lug 1098 (Figs. 34 and 35) carried by the base 50. The forward end of the rod 1096 is positioned close to and in alinement with the rear end of a rod 1099 mounted for horizontal sliding movement in bearings formed in lugs 1100, 1102 carried by the under side of the top of the base 50, the rod 1099 being urged rearwardly by a spring 1104 surrounding the rod 1099 and bearing at its front end against a lug 1100 and at its rear end against a washer 1106 carried by the rod 1099 and restrained against rearward movement by a cotter-pin 1108.

The forward end of the rod 1099 is enlarged as shown at 1110 (Figs. 34 and 35) to limit the rearward movement of the rod 1099 under the influence of the spring 1104. At its forward end the rod 1099 bears against a plate 1112 secured to the left-hand end of the lever 1048. Thus it will be seen that the rocking movement of the lever 1094 in a counterclockwise direction, as viewed in Figs. 3, 4 and 5, will be effective to thrust the rods 1096 and 1099 forwardly, rocking the lever 1048 in a counterclockwise direction, as viewed in Figs. 34 and 35, thereby moving the latch member 1042 to the left and releasing the rod 1040 for upward movement. This counterclockwise rocking movement of the lever 1094 takes place when the inclined end 1078 of the cam 1064, which moves with the gear 368, reaches an inclined surface 1114 (Fig. 4) formed near the end of the lever 1066. As the gear 368 continues to rotate, the right-hand end of the finger 1066 is cammed rearwardly, causing the roll 1086 to rock the right-hand end of the lever 1094 rearwardly, thus moving the rod 1096 forwardly, and, as already set forth, causing the locking bolt 996 to snap into engagement with the groove of the cam 986. The cam 986 at this time is positioned with the uppermost part of its groove opposite the locking bolt 996 and the locking bolt is positioned in its uppermost position with the end of the stop screw 1032 carried by the bell crank lever 992 in engagement with the surface 1034. The cam 986 and, of course, the shaft 314 and the clutch member 316, make one complete revolution after the locking bolt 996 is thus let into engagement with the groove of the cam 986 before the machine is finally brought to rest. During this revolution the bell crank lever 992 is first rocked in a clockwise direction, as viewed in Fig. 33, thus raising the forward end of a rock arm 1116 fast upon the rock shaft 990 to which the bell crank lever 992 is also secured.

Depending from the arm 1116 is a rod 1118 near the lower end of which is a lug 1120, the portion of the rod 1118 below the lug 1120 extending between a pair of pins 1122 (Figs. 32, 34 and 35) carried by a lever 1124 fulcrumed at 1050 and provided near its fulcrum with a pair of shoulders engaged by a spring-pressed plunger 1126 carried by the lever 1048 (Figs. 34 and 37). The lever 1124 is provided with gear teeth meshing with corresponding teeth formed at the right-hand end of a lever 1128 fulcrumed at 1130 to the top of the base 50 and carrying at its rear end a latch member 1132 spring urged in a clockwise direction to the position shown in Figs. 34 and 35 by a spring 1134. A lug 1136 fast upon an arm of a lever 1077 to which the gear sector 914 is secured is arranged to cooperate with the latch member 1132.

The lower end of the shaft 314 is formed as a gear 1140 (Figs. 33 and 34) meshing with a series of three gears 1142 each mounted on a shaft 1144 carried by a web 1146 of the housing 302 and a plate 1148 below and parallel thereto. Meshing with the gears 1142 are gears 1150 similarly mounted and meshing with and driving an internal ring gear 1152 fast upon a shaft 1154 to the lower end of which is splined a clutch member 1156 having a groove 1158 in which are received a pair of pins 1160 carried by a yoke formed as part of a clutch shifting lever 1162 fulcrumed at 1164 to the housing 302 and having a forwardly extending arm 1166 adjacent to the lug 1120 of the rod 1118. Rocking of the lever 1162 in a counterclockwise direction, as viewed in Fig. 33, will bring a series of teeth in the upper surface of the clutch member 1156 into engagement with a similar series of teeth formed on a cooperating clutch member 1168 formed upon an eccentric 1170 mounted for rotary movement upon a sleeve 1172 depending from a support 1174 secured to the housing 302 and forming a casing for the gears 1140, 1142, 1150 and 1152. Surrounding the eccentric 1170 is an eccentric strap 1176 (Figs. 33 and 35) having an arm 1178 pivoted to a rock arm 1180 fast upon a shaft 1182 to which the lever 1077 which carries the gear segment 914 is keyed. Thus it will be seen that when the clutch member 1156 is moved into driving relation to the clutch member 1168, the lever 1077 and the gear sectors 914 and 912 will be oscillated. This takes place when the locking bolt 996 is allowed to enter the groove of the cam 986, the rod 1118 first moving upwardly to permit the lug 1120 to ride up over the end of the arm 1166 of the lever 1162 and then downwardly rocking the lever 1162 in a counterclockwise direction, as viewed in Fig. 33. The forward and rearward movement of the rod 1118 necessary to permit this is not interfered with by the pins 1122 by reason of the manner in which the lever 1124 is permitted by the spring-pressed plungers 1126 to have limited rocking movement. The rocking or oscillating movement imparted by the eccentric 1170 to the lever 1077 is effective not only to swing the lever 906 to depending position, as already set forth, but also to complete the revolution of the gear 368 which, by the time the rod 1118 has moved downwardly thereby bringing the clutch members 1156 and 1168 into driving relation, is no longer driven by power transmitted through the clutch members 312, 316 since those members have been separated by downward movement of the cam 986 caused by the engagement of its groove with the end of the locking bolt 996 which by that time is held against upward movement by engagement of the surface 1030 of the depending arm of the bell crank lever 992 with the surface 1028 of the latch member 1022, as shown in Fig. 33. To cause the completion of the rotation of the gear 368, the lever 914 is, as has already been pointed out, connected to the link 1076 which is, in turn, connected at its rearward end to the rearward arm of the bell crank lever 1070. When the lever 1077 and the gear sector 914 are moved in a counterclockwise direction from the position shown in Fig. 3, the finger 1066 moves, as has already been set forth, to the position shown in Fig. 5. The return movement of the lever 1077 to the position shown in Figs. 3 and 4 causes the right-hand end of the finger 1066 to engage the shoulder 1080 of the cam member 1064, after which the continued movement of the finger 1066 rotates the gear 368 from the position shown in Fig. 5 to the position shown in Figs. 3 and 4. While this takes place, the teeth 344 of the clutch member 340 (Fig. 3) ride under the teeth 342 of the clutch member 344, lifting the latter against the compression of its spring 336. The shaft 326 thus remains stationary so that the parts of the machine driven through the gear 328 are not disturbed.

It is during the portion of the rotation of the gear 368 imparted by the mechanism which has just been described that the cam roll 820 passes from the highest to the lowest portion of the cam 822. The consequent motion of the lever 816 is transmitted through the pantograph mechanism to the feed-lever 726 and by the latter through the rod 810 to the jack 58 to move the jack to the right, as viewed in Fig. 6, to starting position, the first half of the oscillation of the gear sector 914 having been effective just before this to rock the lever 906 to its depending position, moving the jack somewhat downwardly to release the shoe from the presser feet 100, 102 and then forwardly so that the shoe which has been operated upon can be removed and another shoe placed in the jack.

When the lever 1077 and the gear segment 914 are rotated by the eccentric 1170 in a counterclockwise direction as viewed in Figs. 3 and 34 to cause forward movement of the rod 1076 and downward movement of the lever 906, the lug 1136 of the lever 1077 engages the latch member 1132 carried by the lever 1128, rocking the latch member 1132 in a counterclockwise direction as viewed in Fig. 34 against the compression of its spring 1134 and finally passing the latch member 1132 which is returned by its spring 1134 to its normal position. Upon the return movement of the lever 1077, the curved right-hand surface of the lug 1136 engages the left-hand surface of the latch member 1132, and as the latch member 1132 is incapable of further movement in a clockwise direction, rocks the lever 1128 in a counterclockwise direction about its fulcrum 1130. This rocks the lever 1124 in a clockwise direction by reason of the inter-engaging teeth of the two levers, moving the pins 1122 rearwardly and, accordingly, carrying the lower end of the rod 1118 rearwardly so that its lug 1120 passes off the arm 1166 of the clutch lever 1162, allowing the clutch member 1156 to descend to the position shown in Fig. 33 under the action of gravity, aided, if desired, by a suitable spring, and thus disconnecting the eccentric 1170 from the shaft 1154. All this, it will be understood, takes place after the jack 58 has been moved downwardly and forwardly from its operative position and while the jack is being returned to its work receiving position by the weight 708 for the removal of the lasted shoe and the reception of another shoe to be operated on.

The dash-pots

To ease the motion and prevent jarring when the cam roll 820 passes from the high to the low portion of the cam 822, the forward arm of the lever 816 is pivoted to the connecting rod of a dash-pot 1184, the cylinder of which is connected to the base 50. A second dash-pot 1186 has its cylinder connected at 1188 to the base 50, its connecting rod 1190 (Figs. 1 and 3) being connected to a bell crank lever 1192 fulcrumed to the base 50 and having a rearwardly extending arm formed with a gear sector meshing with another gear sector 1194 rigidly secured to the gear 696, thereby controlling the weight 708 and preventing it from dropping with undue violence.

The means for moving the pattern cams

It has already been pointed out that the bank of pattern cams 642 may contain cams which, when brought into operative position, permit the machine to operate alternatively upon shoes which are rights and lefts and to operate alternatively upon shoes of several different styles. For this reason means is provided for raising and lowering the bank of cams 642 bodily. To facilitate this, means is provided for rocking the cam levers 816, 640, 638 and 984 out of engagement with their respective cams. This comprises a hand wheel 1200 (Figs. 1 and 3) fast upon a shaft 1202 provided with right and left hand threads 1204 engaging threaded holes formed in the base 50 of the machine and in a sleeve 1206 pivoted to a lever 1208 fast upon the shaft 362 upon which the levers 640, 638 and 984 are fulcrumed. Also fast upon the shaft 362 are a number of short levers, one of which is shown at 1209 near the bottom of Fig. 1, arranged out of the path of levers 640, 638 and 984 when the machine is running, but positioned to be brought into engagement with those levers when the shaft 362 is rocked in a counterclockwise direction from the position shown in Fig. 3, thereby moving the levers away from their cams. Similarly, the lever 816 is rocked out of engagement with cam 822 by the rotation in a counterclockwise direction of the shaft 362, for which purpose an arm 1210 fast upon the shaft 362 is connected by a pin-and-slot connection with a link 1212 pivoted at its rear end to the rear arm of the lever 816. After the various cam levers have been moved out of engagement with their respective cams by rotation of the hand wheel 1200, the bank of cams 642 can be moved vertically without interfering with the driving connection between the gear 368 and the shaft 354 since one of the gears 366 will at all times mesh with the gear 368. The means for moving the bank of cams 642 vertically is not shown herein in detail since it forms no part of the present invention. It may, for example, take the form disclosed in my copending application Serial No. 637,749 or other suitable mechanism may be used.

The operation of the machine

As the operation of the machine has already been described in detail in connection with the description of its construction, nothing more than a very brief statement of its mode of operation is necessary at this point. The machine is organized to operate automatically, when the treadle 870 is depressed, to cause the upper tensioning and stapling units 54, 56 to operate through a predetermined number of cycles. Each of the pairs of grippers 136 is caused to seize the shoe upper and pull it into lasted relation to the insole and last, whereupon the wipers 226 of the throat blocks 178 wipe the upper inwardly into engagement with the rib and a staple is inserted at each side of the shoe by the drivers 172, through the shoe upper and into the rib, the staples being clenched upon the inner surface of the rib against the clenching surfaces 254 of the presser feet 100, 102. The jack 58 is fed step by step to the left between the successive upper tensioning and stapling operations so that by the time the lasting is finished the tip line of the last in the jack 58 has reached the upper tensioning and stapling units 54, 56. From this position the jack 58 is moved a single step to the right to bring it to the position which it occupies at the start of the lasting operation, the last pin 736 being moved rearwardly relatively to the toe rest 746 during this movement of the jack to release the shoe. After this the machine comes entirely to rest except for the driving motor, the clutch member 312, the shaft 314 and a few parts associated therewith and the operator removes the shoe.

Having thus described my invention, what I claim as new and desire to secure by Letters Patent of the United States is:

1. A side lasting machine having, in combination, means for working a shoe upper over a last having an insole positioned thereon, and a pair of staple-inserting mechanisms arranged to insert staples progressively through opposite marginal portions of the shank and ball portions of the shoe upper into the insole to secure the shoe upper in lasted relation to the insole.

2. A side lasting machine having, in combination, grippers arranged progressively to engage opposite marginal portions of a shoe upper and to stretch the shoe upper progressively over a last having an insole positioned thereon, and means for progressively inserting pairs of staples through opposite marginal portions of the shank and ball portions of the shoe upper into the insole to secure the upper in lasted relation to the insole.

3. A lasting machine having, in combination, means operating on a shoe upper simultaneously at opposite sides thereof between the heel breast line and the tip line to work the upper over a last having a ribbed insole positioned thereon, and means for inserting staples simultaneously through opposite marginal portions of the shoe upper and the rib of the insole to secure the shoe upper in lasted relation to the insole.

4. A side lasting machine having, in combination, means for working a shoe upper over a last having an insole positioned thereon and a pair of fastening inserting mechanisms arranged progressively to insert metallic fastenings at opposite marginal portions of the shank and ball portions of the shoe upper into the rib of the insole in directions substantially parallel to the body of the insole to secure the shoe upper in lasted relation to the insole.

5. A lasting machine having, in combination, means arranged to operate simultaneously along opposite sides of a shoe upper progressively from the vicinity of the heel breast line to the vicinity of the tip line to work a shoe upper over a last, and means for simultaneously inserting metallic fastenings through opposite marginal portions of the shoe upper into the rib of the insole operating progressively with said upper working means to secure the upper in lasted relation to the insole.

6. In a lasting machine, a work support, means for working a shoe upper over a last carried by said support and having an insole positioned thereon, staple inserting means arranged to insert successively pairs of staples through opposite marginal portions of the shoe upper into the insole to secure the shoe upper in lasted relation to the insole and last, and automatically operating means for causing relative movement of the staple inserting means and the work support between the insertion of successive pairs of staples.

7. A lasting machine having, in combination, means including a pair of wipers operating on a shoe upper at opposite sides thereof to work the upper step by step over a last having a ribbed insole positioned thereon, and stapling means arranged to insert staples through opposite marginal portions of the shoe upper into the rib of the insole to secure the shoe upper in lasted relation to the insole.

8. A side lasting machine having, in combination, a pair of wipers arranged to engage opposite marginal portions of the shank and ball portion of a shoe upper to wipe the shoe upper over an insole positioned upon a last, and stapling means arranged to insert staples simultaneously through said portions of the shoe upper into the insole to secure the shoe upper in lasted relation to the insole.

9. A lasting machine having, in combination, means operating on a shoe upper simultaneously at opposite sides thereof to work the upper progressively over a last, staple forming means, and progressively operating means for inserting pairs of staples formed thereby simultaneously through opposite marginal portions of the shoe upper into the insole to secure the upper in lasted relation to the insole.

10. A lasting machine having, in combination, grippers arranged simultaneously to engage opposite marginal portions of a shoe upper to stretch the shoe upper over a last having an insole positioned thereon, staple inserting means arranged to insert staples through opposite marginal portions of the shoe upper into the insole to secure the shoe upper in lasted relation to the insole, and means for feeding a last having a shoe upper and insole assembled thereon progressively past the grippers and the staple inserting means.

11. A side lasting machine having, in combination, grippers arranged simultaneously to engage opposite marginal portions of a shoe upper to stretch the shoe upper over a last having an insole positioned thereon, a pair of progressively operating wipers adjacent to the grippers arranged to wipe the stretched upper over the margin of the insole, and progressively operating metallic fastening inserting means arranged to insert metallic fastenings through opposite marginal portions of the shoe upper into the insole to secure the shank and ball portions of the shoe upper in lasted relation to the insole.

12. A side lasting machine having, in combination, grippers arranged simultaneously to engage opposite marginal portions of a shoe upper to stretch the shoe upper over a last having an insole positioned thereon, a pair of progressively operating wipers adjacent to the grippers and arranged to wipe the stretched upper over the margin of the insole, and progressively operating staple inserting means arranged to insert staples simultaneously through opposite marginal portions of the shoe upper into the insole to secure the shank and ball portion of the shoe upper in lasted relation to the insole.

13. A lasting machine having, in combination, means for engaging the inner face of the rib and the bottom of an insole positioned upon a last, progressively operating means for stretching opposite sides of a shoe upper over the last simultaneously in a direction substantially perpendicular to the shoe bottom, and progressively operating means for driving staples simultaneously through opposite marginal portions of the shoe upper and the rib of the insole arranged to clench the staples against said rib engaging means to secure the upper in lasted relation to the insole.

14. A lasting machine having, in combination, means for engaging the inner face of the rib of an insole positioned upon a last at points upon opposite marginal portions of the insole, means for stretching opposite sides of a shoe upper over the last simultaneously in a direction substantially perpendicular to the shoe bottom, means for wiping the upper into engagement with the rib of the insole at opposite marginal portions of the insole, and means for driving staples simultaneously through opposite marginal portions of the shoe upper into the rib of the insole arranged to clench the staples against said rib engaging means to secure the upper in lasted relation to the insole, said rib engaging means, said stretching means, said wiping means and said staple inserting means operating progressively along the side of the shoe.

15. A lasting machine having, in combination, means arranged to operate simultaneously along opposite sides of a shoe upper progressively from the vicinity of the heel breast line forwardly to the vicinity of the tip line to work the shoe upper over a last, and means for simultaneously inserting staples through opposite marginal portions of the upper into the insole operating progressively with said upper working means to secure the upper in lasted relation to the insole.

16. A lasting machine having, in combination, means arranged to operate on a shoe upper simultaneously at opposite sides thereof to stretch the upper and to wipe its edge over a last having a ribbed insole positioned thereon, means for driving staples substantially parallel to the shoe bottom through opposite marginal portions of the upper and the rib of the insole to secure the upper in lasted relation to the insole, and mechanism for feeding the last, with the shoe upper and the insole thereon, progressively past the upper stretching and wiping means and the staple driving means, successively to present the edge of the shoe upper and the insole to said means.

17. A lasting machine having, in combination, a last support, means arranged simultaneously to engage opposite sides of a shoe upper arranged to work the shoe upper over a last carried by said support, means for inserting staples simultaneously through opposite marginal portions of the shoe upper into an insole positioned on the last to secure the upper in lasted relation to the insole, and mechanism for feeding the last progressively past the upper working means and the stapling means to present different parts of the upper and insole successively to said means.

18. A lasting machine having, in combination, a last support, means arranged to operate progressively and simultaneously along opposite sides of a shoe upper to work the shoe upper over a last carried by said support, means for simultaneously inserting staples through opposite marginal portions of the upper into the insole to secure the upper in lasted relation to the insole, and mechanism for moving the last support step by step to feed the shoe upper and the insole on the last past the upper working means and the staple inserting means and arranged to vary the extent of the feed-steps in accordance with the size of the last carried by the support.

19. A lasting machine having, in combination, grippers arranged simultaneously to grip the marginal portion of a shoe upper at opposite sides of the shoe, means for operating the grippers arranged to cause them to close upon the shoe upper and then to stretch the shoe upper over a last having an insole positioned thereon, stapling means arranged to insert staples simultaneously through opposite marginal portions of the shoe upper into the insole to secure the upper in lasted relation to the insole, controlling means arranged to cause the stretching and staple inserting mechanism to operate through a predetermined number of cycles and then to come to rest, and means for moving the last step by step between the insertion of successive staples to feed the work past the stretching and the staple inserting means.

20. A lasting machine having, in combination, grippers arranged simultaneously to grip the marginal portion of a shoe upper at opposite sides of the shoe, means for operating the grippers arranged to cause them to close upon the shoe upper and then to stretch the shoe upper over a last having an insole positioned thereon, stapling means arranged to insert staples simultaneously through opposite marginal portions of the shoe upper into the insole to secure the upper in lasted relation to the insole, controlling means arranged to cause the stretching and staple inserting means to operate through a predetermined number of cycles and then to come to rest, means for moving the last step by step between the insertion of successive staples to feed the work past the stretching and the staple inserting means, and means operating automatically to return the last after the stretching and stapling means have completed their operation on the shoe.

21. A lasting machine having, in combination, a pair of anvils arranged to engage opposite portions of a rib formed upon an insole assembled upon a last, a pair of wipers arranged to engage opposite marginal portions of a shoe upper upon the last to wipe the upper over the insole and into engagement with the rib of the insole, and staple inserting means arranged to insert staples simultaneously through the wiped-over marginal portions of the shoe upper and the rib of the insole and to clench the staples upon the anvils.

22. A lasting machine having, in combination, a pair of anvils arranged to engage opposite portions of a rib formed upon an insole assembled upon a last, a pair of wipers arranged to engage opposite marginal portions of a shoe upper upon the last to wipe the upper over the insole and into engagement with the rib of the insole, said wipers each being formed with a throat opening, and staple inserting means arranged to insert staples simultaneously through said throat openings into the wiped-over marginal portions of the shoe upper and the rib of the insole and to clench the staples upon the anvils.

23. A lasting machine having, in combination, a work support arranged to carry a last having an insole and a shoe upper assembled upon it, a pair of gripper mechanisms arranged to engage the marginal portion of the shoe upper at opposite sides of the last, cyclically operating means for moving the gripper mechanisms away from the last to stretch the shoe upper over the last, a pair of anvils arranged to engage a rib formed upon the insole at opposite sides of the shoe, and a pair of cyclically operating staple inserting mechanisms arranged to drive staples through the marginal portion of the stretched shoe upper and the rib of the insole and to clench the staples upon the anvils at the opposite sides of the shoe.

24. A lasting machine having, in combination, a work support arranged to carry a last having a ribbed insole and a shoe upper assembled upon it, a pair of wipers, means for moving the wipers inwardly to wipe the shoe upper over the insole, a pair of anvils adjacent to the wipers arranged to engage the rib of the insole at opposite sides of the shoe, and a pair of staple inserting mechanisms arranged to drive staples through the marginal portion of the shoe upper and the rib of the insole at opposite sides of the shoe and to clench the staples upon the anvils.

25. A lasting machine having, in combination, a work support arranged to carry a last having a ribbed insole and a shoe upper assembled upon it, a pair of gripper mechanisms arranged to engage the marginal portion of the shoe upper at opposite sides of the last, a wiper adjacent to each gripper mechanism, cyclically operating means for moving the gripper mechanisms away from the last to stretch the shoe upper thereon and for moving the wipers inwardly to wipe the shoe upper over the insole, a pair of anvils adjacent to the wipers arranged to engage the rib of the insole at opposite sides of the shoe, and a pair of staple inserting mechanisms arranged to drive staples through the shoe upper and the rib of the insole and to clench the staples upon the anvils at the opposite sides of the shoe.

26. A lasting machine having, in combination, a pair of gripper mechanisms arranged simultaneously to engage opposite edges of a shoe upper held in assembled relation to a last and insole, a cam, connections from the cam to move the gripper mechanisms away from the last to stretch the shoe upper thereon, another cam, connections from said other cam to vary the stretch applied to different parts of the shoe upper by the gripper mechanisms, and a pair of staple inserting mechanisms co-operating with the two gripper mechanisms to insert staples simultaneously through opposite marginal portions of the stretched shoe upper into the insole to hold the upper in lasted relation to the insole.

27. A lasting machine having, in combination, a jack, a pair of gripper mechanisms arranged simultaneously to engage opposite edges of a shoe upper held in assembled relation to a last upon said jack and to an insole on the last, means for moving the gripper mechanisms away from the last to stretch the shoe upper thereon, a wiper adjacent to each gripper mechanism for wiping the shoe upper inwardly over the insole, a pair of staple inserting mechanisms co-operating with the two wipers and with the two gripper mechanisms to insert staples simultaneously through opposite marginal portions of the shoe upper into the insole to hold the upper in lasted relation to the insole, means for causing relative movement of the jack and the grippers, the wipers and the staple inserting mechanisms, and means for controlling the gripper moving means to vary the stretching given to different parts of the shoe upper.

28. A lasting machine having, in combination, a work support arranged to carry a last having an insole and a shoe upper assembled upon it, a pair of gripper mechanisms arranged to engage the shoe upper upon opposite sides of the last, means for moving the gripper mechanisms away from the last to stretch the shoe upper thereon, a wiper adjacent to each gripper mechanism for wiping the shoe upper inwardly over the insole into lasted relation thereto, and a pair of staple inserting mechanisms co-operating with the wiper and with the gripper mechanisms to insert staples through opposite marginal portions of the shoe upper into the insole to hold the upper in lasted relation to the insole.

29. A lasting machine having, in combination, a pair of gripper mechanisms arranged simultaneously to engage opposite edges of a shoe upper held in assembled relation to a last and insole, a wiper adjacent to each gripper mechanism, and cyclically operating means for moving the gripper mechanisms away from the last to stretch the shoe upper over the last, said gripper mechanisms being arranged to maintain their grip upon the shoe upper until the wipers have obtained a firm hold upon the upper and thereafter to release the upper.

30. A lasting machine having, in combination, a pair of gripper mechanisms arranged simultaneously to engage opposite edges of a shoe upper held in assembled relation to a last and insole, a wiper adjacent to each gripper mechanism, cyclically operating means for moving the gripper mechanisms away from the last to stretch the shoe upper over the last, said grippers being arranged to maintain their grip upon the shoe upper until the wipers have obtained a firm hold upon the upper and thereafter to release the upper, and means for driving fastenings through the marginal portion of the shoe upper into the insole to secure the upper in lasted relation to the insole and last.

31. A lasting machine having, in combination, a work support arranged to carry a last having an insole and a shoe upper assembled upon it, a gripper arranged to engage the marginal portion of the shoe upper, means for causing relative movement of the work support and the gripper lengthwise of the shoe carried by the work support to cause the gripper to operate progressively along the shoe upper, means for moving the gripper heightwise of the last toward and from the marginal portion of the shoe upper to cause the gripper to stretch the shoe upper progressively over the last, and means including a pair of springs arranged to cooperate with said last named means to cause the gripper to move away from the insole and shoe upper a less distance from the body of the insole while operating at the shank portion of the shoe upper than while operating at the forepart.

32. A lasting machine having, in combination, a work support arranged to carry a last having an insole and a shoe upper assembled upon it, a pair of gripper mechanisms arranged to engage the marginal portions of the shoe upper at opposite sides of the last, means for causing relative movement of the work support and the gripper mechanisms lengthwise of the shoe carried by the work support to cause the gripper mechanisms to operate progressively along the shoe upper, means for moving the gripper mechanisms heightwise of the last toward and from the marginal portion of the shoe upper to cause the gripper mechanisms to stretch the shoe upper progressively over the last, a pair of springs, and means for operating the springs alternatively to cause the gripper mechanisms to move away from the insole and shoe upper a less distance from the body of the insole while operating at the shank portion of the shoe upper than while operating at the forepart.

33. A lasting machine having, in combination, a work support arranged to carry a last sole upwardly with an insole and shoe upper assembled upon it, a pair of gripper mechanisms arranged to engage the marginal portions of the shoe upper at opposite sides of the last, means for causing relative movement of the work support and the gripper mechanisms lengthwise of a shoe carried by the work support to cause the gripper mechanisms to operate progressively along the shoe upper, means for moving the gripper mechanisms heightwise of the last to cause the gripper mechanisms to stretch the shoe upper progressively over the last, and means including a light spring and a heavy spring arranged to cause the heightwise movement of the gripper mechanisms away from the insole and shoe upper to increase as the operation of the grippers is transferred from the shank portion of the shoe upper to the forepart of the shoe.

34. A lasting machine having, in combination, a work support arranged to support a last with a ribbed insole and a shoe upper assembled upon it, a pair of gripper mechanisms arranged to engage the marginal portions of the shoe upper at opposite sides of the last, means for causing relative movement of the work support and the gripper mechanisms lengthwise of a shoe carried by the work support to cause the gripper mechanisms to operate progressively along the shoe upper, cyclically operating means for moving the gripper mechanisms heightwise of the last to cause the gripper mechanisms to stretch the shoe upper progressively over the last including a pair of springs the operation of which causes the gripper mechanisms to move away from the insole and shoe upper varying distances relatively to the top of the rib of the insole while operating from the heel breast line to the tip line, and means operating progressively with the gripper mechanisms for driving staples through the marginal portion of the shoe upper into the rib of the insole to secure the upper in lasted relation to the insole and last.

35. A lasting machine having, in combination, a work support arranged to support a last sole upwardly with a ribbed insole and a shoe upper assembled upon it, a pair of gripper mechanisms arranged to engage the marginal portions of the shoe upper at opposite sides of the last, means for causing relative movement of the work support and the gripper mechanisms lengthwise of a shoe carried by the work support to cause the gripper mechanisms to operate progressively along the shoe upper, cyclically operating means for moving the gripper mechanisms heightwise of the last to cause the gripper mechanisms to stretch the shoe upper progressively over the last including a light spring and a heavy spring alternatively operative to cause the gripper mechanisms to move away from the insole and shoe upper different distances from the body of the insole the heightwise movement of the grippers being less relatively to the rib of the insole while operating at the portion of the shank adjacent to the heel breast line than the heightwise movement of the grippers while operating in the vicinity of the ball portion of the shoe, and means operating progressively with the gripper mechanisms for inserting fastenings through the marginal portion of the shoe upper into the rib of the insole to secure the upper in lasted relation to the insole and last.

36. A lasting machine having, in combination, a pair of shoe upper working and staple inserting units, a jack aranged to present to said units a partly completed shoe comprising an upper and an insole assembled upon a last, means for causing said units to operate progressively at opposite sides of the shoe to work the shoe upper over the last and to insert staples to secure the marginal portion of the shoe uper to the insole along its shank and ball portions, and means for controlling said units as they operate at different points along the sides of the shoe arranged to maintain the relation of the staple inserting units to the edge of the insole uniform while operating at different points along the edge of the shoe.

37. A lasting machine having, in combination, a pair of shoe upper working and staple inserting units arranged to work a shoe upper over a last having an insole positioned thereon and to secure the upper in lasted relation to the insole, means for causing said units to operate progressively at opposite sides of the shoe, and means for causing relative movement of the last and said units to maintain constant the angular relation of the units to the edge of the insole as they operate on different parts of the shoe.

38. A lasting machine having, in combination, a pair of shoe upper working and staple inserting units, a jack arranged to present to said units a partly completed shoe comprising an upper and a ribbed insole assembled upon a last, means for causing said units to operate progressively at opposite sides of the shoe to work the shoe upper over the last and to insert staples to secure the marginal portion of the shoe upper to the rib of the insole along its shank and ball portions, and means for controlling said units as they operate at different points along the sides of the shoe arranged to maintain the line of drive of the staples at all times substantially at right angles to the rib of the insole.

39. A lasting machine having, in combination, a pair of shoe upper working and staple inserting units, a jack arranged to present to said units a partly completed shoe comprising an upper and an insole assembled upon a last, means for causing said units to operate progressively at opposite sides of the shoe to work the shoe upper over the last and to insert staples to secure the marginal portion of the shoe upper to the insole along its shank and ball portions, and means for rocking said units about axes substantially at right angles to the bottom of the last so that the relation of the upper working and staple inserting mechanism carried by the units to the edge of the insole is maintained substantially uniform while operating at different points along the sides of the shoe.

40. A lasting machine having, in combination, a pair of shoe upper working and staple inserting units, a jack arranged to present to said units a partly completed shoe comprising an upper and an insole assembled upon a last, means for causing said units to operate progressively at opposite sides of the shoe to work the shoe upper over the last and to insert staples to secure the marginal portion of the shoe upper to the insole along its shank and ball portions, means for rocking the jack about an axis substantially parallel to the bottom of the last and extending tranversely thereof arranged to present the shoe and last to the upper working and staple inserting instrumentalities with the portion of the insole to which the upper is about to be or is being secured always in substantially the same plane.

41. A lasting machine having, in combination, a pair of shoe upper working and staple inserting units arranged to work a shoe upper over a last having an insole positioned thereon and to secure the marginal portions of the upper in lasted relation to the insole, means for causing said units to operate progressively at opposite sides of the shoe between the heel breast line and the tip line thereof, and means for causing relative movement of the last and said units arranged to maintain the angular relation of the units to the surface of the insole adjacent thereto substantially constant while the units operate upon different portions of the shoe.

42. A lasting machine having, in combination, a work support arranged to hold a last having an insole and a shoe upper assembled thereon, a gripper arranged to engage the marginal portion of a shoe upper upon a last carried by the work support adjacent to the heel breast line and to stretch the shoe upper heightwise over the last, means for causing relative movement of the gripper and the last lengthwise of the last in a direction to stretch the portion of the upper between the gripper and the rear end of the shoe lengthwise of the shoe, thereby to eliminate any wrinkles that may be present between the gripper and the rear end of the shoe, and means for inserting a staple through the tensioned shoe upper into the insole to secure the upper in lasted relation to the insole and last.

43. A side lasting machine having, in combination, grippers arranged to engage opposite marginal portions of a shoe upper adjacent to the heel breast line, means to cause relative movement of the grippers and a last on which the shoe upper and an insole are assembled heightwise of the last to stretch the upper over the last, means for causing relative movement of the grippers and the last in a direction lengthwise of the last to stretch the portion of the shoe upper between the grippers and the rear end of the shoe, thereby eliminating any wrinkles which may be present rearwardly of the grippers, and means for inserting a pair of fastenings, one at each side of the shoe, through the marginal portion of the shoe upper into the insole to secure the upper in lasted relation to the insole and the last.

44. A lasting machine having, in combination, a gripper arranged to engage the marginal portion of a shoe upper adjacent to the heel breast line and to stretch the shoe upper heightwise over a last having an insole positioned thereon, means for moving the last rearwardly while the upper is thus engaged to stretch the upper lengthwise of the shoe, thereby to eliminate any wrinkles that may be present between the gripper and the rear end of the shoe, and means for inserting a fastening through the tensioned shoe upper into the insole to secure the upper in lasted relation to the insole and last.

45. A side lasting machine having, in combination, grippers arranged to engage opposite marginal portions of a shoe upper adjacent to the heel breast line and to stretch the upper heightwise over a last having a ribbed insole positioned thereon, means for causing relative movement of the grippers and the last in a direction lengthwise of the last to stretch the portion of the shoe upper between the grippers and the rear end of the shoe, thereby eliminating any wrinkles which may be present rearwardly of the grippers, and means for forming staples and for inserting a pair of said staples, one at each side of the shoe, through the marginal portion of the shoe upper into the rib of the insole to secure the upper in lasted relation to the insole and the last.

46. A lasting machine having, in combination, a gripper arranged to engage the marginal portion of a shoe upper adjacent to the heel breast line and to stretch the shoe upper heightwise over a last having a ribbed insole positioned thereon, means for moving the last rearwardly while the upper is thus engaged to stretch the upper lengthwise of the shoe, thereby to eliminate any wrinkles that may be present between the gripper and the rear end of the shoe, and means for inserting a staple through the tensioned shoe upper and the rib of the insole to secure the upper in lasted relation to the insole and last.

47. A lasting machine having, in combination, a jack, a pair of shoe upper working and staple inserting units arranged to work the shoe upper over a last carried by the jack and having an insole positioned thereon and to secure the marginal portions of the upper in lasted relation to the insole, means for moving the jack substantially lengthwise of the last carried thereby to cause said units to operate progressively at opposite sides of the shoe between the heel breast line and the tip line thereof, a cam, and connections from the cam to the jack arranged to rock the jack so as to maintain the angular relation of the units to the surface of the insole adjacent thereto substantially constant while the units operate upon different portions of the shoe.

48. A lasting machine having, in combination, a pair of shoe upper working and staple inserting units arranged to work a shoe upper over a last having a ribbed insole positioned thereon and to secure the upper in lasted relation to the insole, said units each having a presser-foot provided with a rib-engaging surface, means for causing said units to operate progressively at opposite sides of the shoe, means for pressing the rib-engaging surfaces of said presser-feet against the rib of the insole and for controlling the pressure exerted by the pressure-feet against the rib of the insole arranged to maintain the pressure substantially constant regardless of variations in the width of different parts of the insole.

49. A lasting machine having, in combination, a jack, means for working a shoe upper progressively over a last carried by the jack, means for securing the marginal portions of the shoe upper in lasted relation to an insole positioned on the last, a presser foot adjacent to said upper working and securing means, means for moving the jack step by step in the general direction of the length of the last successively to present different portions of the shoe upper to the upper working and securing means, a cam, and connections from the cam to the jack arranged to hold the jack in operative relation to said presser-foot with the insole forcibly pressed against the presser-foot, while the upper is being secured to the insole, and to relieve the pressure of the insole against the presser foot during feeding movement of the jack.

50. A lasting machine having, in combination, a jack, means for working a shoe upper progressively over a last carried by the jack, staple inserting means arranged to secure the marginal portions of the shoe upper in lasted relation to an insole positioned on the last, a presser foot adjacent to said upper working and fastening inserting means, means for moving the jack step by step in the general direction of the length of the last successively to present different portions of the shoe upper to the upper working and staple inserting means, a cam and connections from the cam to the jack including a spring operating to hold the jack in operative relation to said presser foot with the insole forcibly pressed against the presser foot during the insertion of the staples, said cam being arranged to relieve the pressure of the insole against the presser foot during feeding movement of the jack.

51. A lasting machine having an abutment arranged to engage an insole positioned upon a last, a gripper arranged to engage the marginal portions of a shoe upper assembled on the last, means for operating the gripper to close it upon the shoe upper and to stretch the shoe upper over the last arranged to cause the gripper to exert a relatively light stretching force while operating upon the shank portion of the shoe upper and a relatively strong stretching force while stretching the upper over the forepart of the last, and means for inserting metallic fastenings through the shoe upper into the insole to secure the shoe upper in lasted relation to the last and insole.

52. A lasting machine having, in combination, a jack, two grippers, means for simultaneously operating said grippers to engage the marginal portions of a shoe upper at opposite sides thereof and to stretch the upper over a last carried by the jack, means for causing relative movement of the jack and the grippers in the general direction of the length of the last carried by the jack to cause the grippers to operate progressively along the sides of the shoe, means for securing the shoe upper in lasted relation to an insole positioned on the last carried by the jack, a shaft having a pair of cams secured thereto, connections from one of the cams to the gripper-operating means arranged to cause the cam to vary the stretch given by the grippers to different parts of the shoe upper, and connections from the other cam to the grippers to control the position of the grippers widthwise of the last.

53. A lasting machine having an abutment arranged to engage an insole positioned upon a last, a gripper arranged to engage the marginal portions of a shoe upper assembled on the last, means for operating the gripper to close it upon the shoe upper and to stretch the shoe upper over the last including a relatively weak spring through which a light stretching force is transmitted to the gripper while operating upon the shank portion of the shoe upper, and a relatively strong spring through which a greater stretching force is applied to the gripper while stretching the upper over the forepart of the last.

54. A lasting machine having an abutment arranged to engage an insole positioned upon a last, a gripper arranged to engage the marginal portions of a shoe upper assembled on the last, means for operating the gripper to close it upon the shoe upper and to stretch the shoe upper over the last including a relatively weak spring through which a light stretching force is transmitted to the gripper while operating upon the shank portion of the shoe upper, a relatively strong spring through which a greater stretching force is applied to the gripper while stretching the upper over the forepart of the last, and a cam for controlling the operation of said springs.

55. A lasting machine having, in combination, a jack, a gripper arranged to engage the marginal portion of a shoe upper to stretch the upper about a last carried by the jack, a lever connected to the gripper cyclically operating means to rock the lever thereby to close the gripper upon the shoe upper and to stretch the shoe upper over the last, and means for varying the stretching force applied by the gripper to the shoe upper comprising a lever, a relatively light spring connected to the lever for limiting the stretching force which the gripper can apply to the shoe upper while operating at the shank thereof, a two-part lever, the parts of which are connected by a relatively heavy spring, connected to said first-named lever, and means arranged for rocking said two-part lever about its fulcrum thereby to apply a relatively great stretching force through said heavy spring while the gripper is operating at the ball portion of the shoe upper.

56. A lasting machine having, in combination, a jack, a gripper arranged to engage the marginal portion of a shoe upper to stretch the upper about a last carried by the jack, a lever connected to the gripper, cyclically operating means to rock the lever thereby to close the gripper upon the shoe upper and to stretch the shoe upper over the last, and means for varying the stretching force applied by the gripper to the shoe upper comprising a lever, a relatively light spring connected to the lever for limiting the stretching force which the gripper can apply to the shoe upper while operating on the shank thereof, a two-part lever, the parts of which are connected by a relatively heavy spring, connected to said first-named lever, a cam arranged to rock said two-part lever about its fulcrum thereby to apply a relatively great stretching force through said heavy spring to the gripper while it is operating at the ball portion of the shoe upper, and means for securing the shoe upper in lasted relation to an insole positioned on the last.

57. A lasting machine having, in combination, a jack, two upper grippers arranged simultaneously to engage the marginal portions of a shoe upper at opposite sides thereof and to stretch the upper over a last carried by the jack, and abutment adjacent to each gripper arranged to resist upward movement of the last as the shoe upper is stretched upon the last, means to move the last and the shoe upper arranged to feed different portions of the shoe upper successively to the grippers to cause the latter to operate progressively along the shank and the ball portions of the shoe upper, means to secure the shoe upper in lasted relation to an insole positioned upon the last, a shaft, three cams upon the shaft, connections from the first cam to the abutments and grippers arranged to control the spacing of the abutments and grippers transversely of the last in accordance with the width of the portion of the last about which the upper is being stretched, connections from the second cam to the grippers arranged to vary the stretching force applied by the grippers to the shoe upper as the grippers operate upon different parts of the shoe upper, and connections from the third cam to the jack arranged to relieve the pressure of the work piece against the abutments during the feeding movements of the jack.

58. A lasting machine having, in combination, a lever, a throat member provided with a driver passage and with a wiper carried by said lever, a second lever, a driver carried thereby and positioned in said driver passage, means for swinging one of said levers about its fulcrum, and connections between the two levers whereby the operation of said swinging means is effective first to move the throat member into engagement with the work and to cause the wiper to wipe a portion of the shoe upper into lasted position and then to move the driver through the driver passage to insert a fastening to secure the shoe upper in lasted position.

59. A machine of the class described having a throat member arranged for movement into and out of engagement with a shoe upper and provided with a driver passage, said throat member serving also as a wiper, a driver mounted for movement in the driver passage of said throat member, and connections between the throat member and the driver whereby during the first portion of the fastening inserting stroke the driver moves relatively slowly while the throat is moved more rapidly into engagement with the shoe upper, thereby wiping the shoe upper into lasted relation to an insole and a last upon which it is mounted, and thereafter comes to rest after which the motion of the driver is accelerated and is thereby effective to drive a fastening into the shoe upper to secure the upper in lasted position.

60. A machine for use in the manufacture of shoes having, in combination, a jack, a pair of sets of operating instrumentalities arranged to operate simultaneously upon opposite sides of a shoe carried by the jack, means connected to the jack for varying the initial spacing of the two sets of operating instrumentalities in accordance with the size of the shoe in the jack including a member arranged to be positioned in accordance with the size of the shoe in the jack prior to the starting of the operation, connections between said member and the operating instrumentalities arranged to position said instrumentalities initially in accordance with the position of said member, and means for breaking the connections between the member and the operating instrumentalities after the latter have been initially positioned but before the starting of the operation.

61. A machine for use in the manufacture of shoes having, in combination, a jack, a pair of sets of lasting instrumentalities arranged to operate simultaneously upon opposite sides of a shoe carried by the jack, means connected to the jack for operating the initial spacing of the two sets of lasting instrumentalities in accordance with the size of the shoe in the jack, said means including a member arranged to be positioned in accordance with the size of the shoe in the jack prior to the starting of the lasting operation, connections between said member and the lasting instrumentalities arranged to position said instrumentalities initially in accordance with the position of said member, and means for breaking the connections between the member and the lasting instrumentalities after the latter have been initially positioned but before the starting of the lasting operation.

62. A machine for use in the manufacture of shoes having, in combination, a jack, a pair of sets of operating instrumentalities arranged to operate simultaneously upon opposite sides of a shoe carried by the jack, means for varying the initial spacing of the two sets of operating instrumentalities in accordance with the size of the shoe in the jack including a lever connected to the jack and arranged to be positioned prior to the starting of the operation in accordance with the size of a shoe in the jack, a member arranged to be positioned by said lever also prior to the starting of the operation, and connections between said member and the operating instrumentalities arranged to position said instrumentalities initially in accordance with the positions of said lever and said member, and means for breaking the connections between the member and the operating instrumentalities after the latter have been initially positioned but before the starting of the operation.

63. A machine for use in the manufacture of shoes having, in combination, a jack, a pair of sets of lasting and staple inserting instrumentalities arranged to operate simultaneously upon opposite sides of a shoe carried by the jack, means for varying the initial spacing of the two sets of lasting and staple inserting instrumentalities in accordance with the size of the shoe in the jack, said means including a lever connected to the jack and arranged to be positioned prior to the starting of the lasting operation in accordance with the size of the shoe in the jack, a member arranged to be positioned by said lever also prior to the starting of the lasting operation, connections between said member and the lasting and staple inserting instrumentalities arranged to position said instrumentalities initially in accordance with the positions of said lever and said member, and means for breaking the connections between the member and the lasting and staple inserting instrumentalities after the latter have been initially positioned but before the starting of the lasting operation.

64. A machine for use in the manufacture of shoes having, in combination, means arranged to operate in succession at points upon opposite sides of a shoe and spaced lengthwise of the sole thereof, a jack arranged to present a shoe to said operating instrumentalities, means to move the jack step by step in the general direction of the length of a shoe in the jack to present the shoe to said operating instrumentalties, means controlled by the length of a shoe in the jack to determine the length of each step of the feeding movement of the jack, and means for positioning the operating instrumentalities in accordance with the size of the shoe in the jack arranged to position said instrumentalities prior to the starting of the operation upon the shoe in accordance with the width of the part of the shoe at which the operation is first to be performed, said positioning means including connections to the means for controlling the length of each step of the feeding movement of the jack, and means for rendering said connections inoperative after the operating instrumentalities have been positioned but before the starting of the operation.

65. A machine for use in the manufacture of shoes having, in combination, means arranged to operate in succession at points upon opposite sides of the shoe and spaced lengthwise of the sole thereof to work the shoe upper into lasted relation to an insole and a last upon which it is mounted and to insert staples to secure the upper in lasted position, a jack arranged to present a shoe and a last to said instrumentalities, means to move the jack step-by-step in the general direction of the length of the shoe as the lasting operation is performed, means controlled by the length of the shoe in the jack to determine the length of each step of the feeding movement of the jack, and means constructed and arranged to position the upper working and staple inserting instrumentalities prior to the starting of the lasting operation in accordance with the width of the part of the shoe at which the operation is first to be performed, said positioning means including connections to the means for controlling the length of each step of the feeding movement of the jack, and means for rendering said connections inoperative after the upper working and staple inserting instrumentalities have been positioned but before the starting of the lasting operation.

66. A machine for use in the manufacture of shoes having, in combination, instrumentalities arranged to operate in succession at points upon opposite sides of a shoe and spaced lengthwise of the sole thereof, a jack arranged to present a shoe to said operating instrumentalities, means to move the jack step by step in the general direction of the length of a shoe in the jack to present the shoe to said operating instrumentalities, means controlled by the length of a shoe in the jack to determine the length of each step of the feeding movement of the jack, and means for positioning the operating instrumentalities in accordance with the size of the shoe in the jack arranged to position said instrumentalities prior to the starting of the operation upon the shoe in accordance with the width of the part of the shoe at which the operation is first to be performed, said positioning means including a toggle, connections between the toggle and the means for controlling the length of each step of the feeding movement of the jack, and means for straightening the toggle to render the positioning means effective and for breaking the toggle to disconnect the operating instrumentalities and the means for determining the length of each step of feeding movement of the jack after the operating instrumentalities have been positioned but before the starting of the operation.

67. A machine for use in the manufacture of shoes having, in combination, a jack, means for operating upon opposite sides of a shoe on a last carried by the jack, an abutment arranged to resist upward movement of the shoe and last, means to move the last and the shoe thereby to feed different portions of the shoe successively to the operating means to cause the latter to operate progressively along the shoe, a shaft, two cams upon the shaft, connections from one of the cams to the operating means arranged to control the spacing of said means transversely of the last in accordance with the width of the last at the portion operated upon, and connection from the other cam to the jack arranged to relieve the pressure of the last against the abutments during the feeding movements of the jack.

68. A fastening inserting machine having, in combination, a jack, a pair of abutments arranged during the lasting operation to bear against the bottom and opposite parts of the inner surface of the rib of a ribbed insole positioned upon a last carried by the jack, a spring urging said abutments apart against opposite portions of the rib of the insole, means for moving said abutments toward each other against the action of said spring prior to the commencing of the fastening inserting operation into positions determined by the size of the last in the jack, said abutment moving means comprising connections between the abutments and the jack arranged to position the abutments in accordance with the size of the last in the jack, and means for breaking said connections after the last has been placed in the jack and the position of the abutments has thereby been determined but before the starting of the insertion of fastenings.

69. A lasting machine having a jack, two sets of lasting instrumentalities positioned one upon each side of a shoe carried by the jack and comprising means to work the shoe upper over a last carried by the jack, means to insert staples through the shoe upper at opposite sides of the shoe and through opposite portions of the rib of an insole positioned upon the last to secure the shoe upper in lasted relation to the insole, a pair of abutments arranged to resist upward movement of the insole and last as the shoe upper is worked over the last and each provided with a clenching surface arranged to clench the staples upon the inner surface of the rib of the insole, means for moving the jack step by step to present different portions of the shoe successively to the lasting instrumentalities comprising a lever connected to the jack, means for moving said lever step by step in a path and by steps the length of which are both controlled by the size of the shoe in the jack, means for controlling the initial position of the lasting instrumentalities in accordance with the size of the shoe in the jack so that the abutments will be initially positioned inside of but closely adjacent to opposite parts of the insole regardless of the size of the shoe in the jack, said controlling means including a member positioned by said lever in accordance with the size of the shoe in the jack before the starting of the lasting operation and connections from said lever to the lasting instrumentalities including a toggle and means for straightening the toggle after a shoe has been placed in the jack but before the starting of the lasting operation whereby said connections are rendered operative to position the lasting instrumentalities in accordance with the size of the shoe in the jack, and means for then breaking said toggle to disconnect the lasting instrumentalities from the lever so that the lasting means will not be affected by subsequent movement of the lever as the jack is moved to feed the shoe.

In testimony whereof I have signed my name to this specification.

ROBERT H. LAWSON.